US011385158B2

(12) United States Patent
Blandin et al.

(10) Patent No.: US 11,385,158 B2
(45) Date of Patent: Jul. 12, 2022

(54) OPTICAL METHOD FOR ESTIMATING A REPRESENTATIVE VOLUME OF PARTICLES PRESENT IN A SAMPLE BASED ON A SIZE OF EACH REGION OF INTEREST

(71) Applicants: COMMISSARIAT A L'ENERGIE ATOMIQUE ET AUX ENERGIES ALTERNATIVES, Paris (FR); HORIBA ABX SAS, Montpellier (FR)

(72) Inventors: Pierre Blandin, Coublevie (FR); Anais Ali-Cherif, Clermont-Ferrand (FR); Aurelien Daynes, Montpellier (FR); Estelle Gremion, La Tour du Pin (FR); Damien Isebe, Grabels (FR)

(73) Assignees: COMMISSARIAT A L'ENERGIE ATOMIQUE ET AUX ENERGIES ALTERNATIVES, Paris (FR); HORIBA ABX SAS, Montpellier (FR)

(*) Notice: Subject to any disclaimer, the term of this patent is extended or adjusted under 35 U.S.C. 154(b) by 142 days.

(21) Appl. No.: 16/760,777

(22) PCT Filed: Oct. 30, 2018

(86) PCT No.: PCT/FR2018/052689
§ 371 (c)(1),
(2) Date: Apr. 30, 2020

(87) PCT Pub. No.: WO2019/086800
PCT Pub. Date: May 9, 2019

(65) Prior Publication Data
US 2020/0326269 A1 Oct. 15, 2020

(30) Foreign Application Priority Data
Nov. 2, 2017 (FR) ...................... 1760338

(51) Int. Cl.
*G01N 15/02* (2006.01)
*G06T 7/62* (2017.01)
(Continued)

(52) U.S. Cl.
CPC ..... *G01N 15/0227* (2013.01); *G01N 15/1434* (2013.01); *G01N 15/1463* (2013.01);
(Continued)

(58) Field of Classification Search
CPC .......... G01N 15/0227; G01N 15/1434; G01N 2015/0073; G01N 2015/0233;
(Continued)

(56) References Cited

U.S. PATENT DOCUMENTS

2012/0218379 A1* 8/2012 Ozcan ................. G03H 1/0866
348/40
2012/0294136 A1* 11/2012 Sato ..................... G03H 1/0443
369/112.15
(Continued)

FOREIGN PATENT DOCUMENTS

FR       3 049 347 A1    9/2017
FR       3 049 348 A1    9/2017
WO    WO 2016/097092 A1    6/2016

OTHER PUBLICATIONS

International Search Report dated Feb. 14, 2019 in PCT/FR2018/052689 filed on Oct. 30, 2018, 3 pages.
(Continued)

*Primary Examiner* — Michael P LaPage
(74) *Attorney, Agent, or Firm* — Oblon, McClelland, Maier & Neustadt, L.L.P.

(57) ABSTRACT

The invention is a method for estimating a representative volume of particles of interest (10 *i*) immersed in a sample, the sample extending in at least one plane, referred to as the sample plane (P 10), the sample comprising a sphering
(Continued)

agent, capable of modifying the shape of the particles, the method comprising the following steps: a) illuminating the sample by means of a light source (11), the light source emitting an incident light wave (12) propagating towards the sample (10) along a propagation axis (Z); b) acquiring, by means of an image sensor (16), an image (I 0) of the sample (10), formed in a detection plane (P 0), the sample being arranged between the light source (11) and the image sensor (16), each image being representative of a light wave (14) referred to as an exposure light wave, to which the image sensor (16) is exposed under the effect of illumination; c) using the image of the sample (I 0), acquired during step b), and a holographic propagation operator, to calculate a complex expression (A (x, y, z)) of the exposure light wave (14) in different positions relative to the detection plane; the method comprising a step of estimating the representative volume (AA) of the particles of interest (10 $i$) depending on the complex expressions calculated during step c).

12 Claims, 12 Drawing Sheets

(51) Int. Cl.
| | | |
|---|---|---|
| *G06T 7/11* | (2017.01) | |
| *G01N 15/14* | (2006.01) | |
| *G03H 1/00* | (2006.01) | |
| *G03H 1/08* | (2006.01) | |
| *G01N 15/00* | (2006.01) | |

(52) U.S. Cl.
CPC ......... *G03H 1/0005* (2013.01); *G03H 1/0866* (2013.01); *G06T 7/11* (2017.01); *G06T 7/62* (2017.01); *G01N 2015/0073* (2013.01); *G01N 2015/0233* (2013.01); *G03H 2001/005* (2013.01); *G03H 2210/55* (2013.01); *G06T 2207/10056* (2013.01); *G06T 2207/30024* (2013.01)

(58) Field of Classification Search
CPC ....... G01N 15/1463; G01N 2015/1454; G03H 1/00; G03H 1/0866; G03H 2001/005; G03H 2210/55; G03H 2001/0447; G03H 1/0443; G03H 2001/0883; G06T 7/11; G06T 7/62; G06T 2207/10056; G06T 2207/30024
See application file for complete search history.

(56) References Cited

U.S. PATENT DOCUMENTS

| | | | |
|---|---|---|---|
| 2013/0260396 A1* | 10/2013 | Akcakir | ............... G03H 1/0443 435/7.25 |
| 2016/0042507 A1* | 2/2016 | Turner | .................... B01L 3/508 382/128 |
| 2017/0132450 A1* | 5/2017 | El-Zehiry | .......... G06K 9/00127 |
| 2017/0284926 A1 | 10/2017 | Perraut et al. | |
| 2019/0101482 A1 | 4/2019 | Allier et al. | |
| 2019/0101484 A1 | 4/2019 | Herve et al. | |

OTHER PUBLICATIONS

Kim, Y. R. et al., "Isovolumetric Sphering of Erythrocytes for More Accurate and Precise Cell Volume Measurement by Flow Cytometry," Cytometry, vol. 3, No. 6, 1983, pp. 419-427, XP002358325.

Memmolo, P. et al., "3D Morphometry of Red Blood Cells by Digital Holography," Cytometry Part A, vol. 85A, 2014, pp. 1030-1036, XP055209821.

Curl, C. L. et al., "Single Cell Volume Measurement by Quantitative Phase Microscopy (QPM): A Case Study of Erythrocyte Morphology," Cellular Physiology and Biochemistry, vol. 17, 2006, pp. 193-200, XP002511706.

* cited by examiner

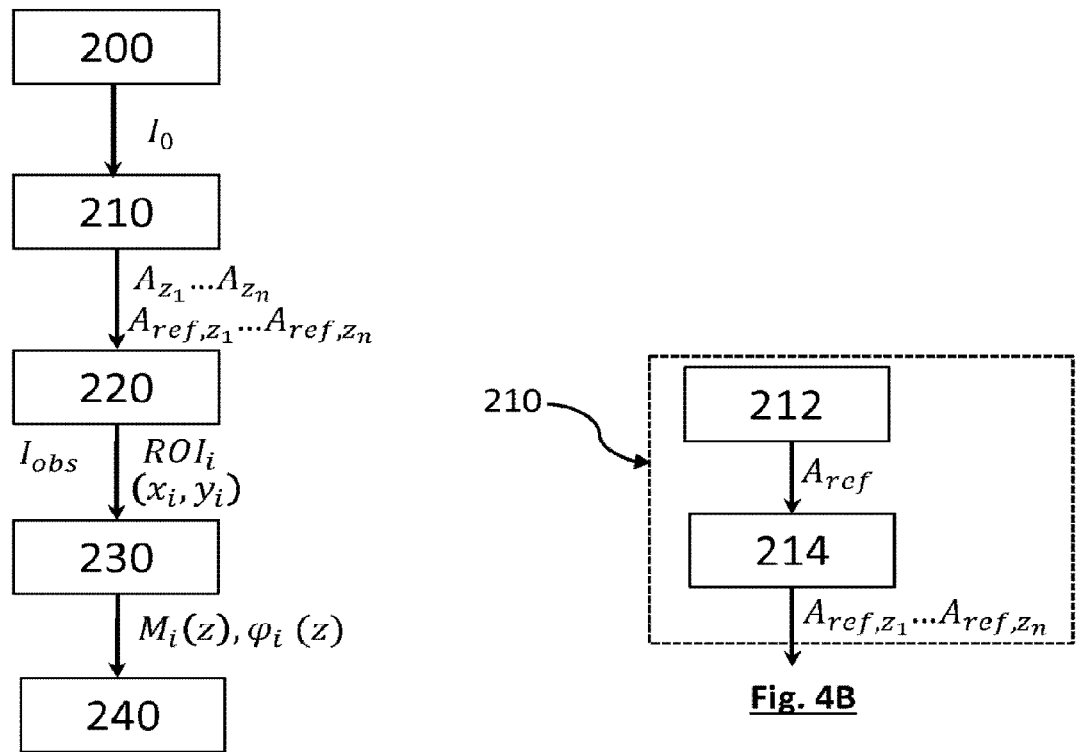
Fig. 4A
Fig. 4B
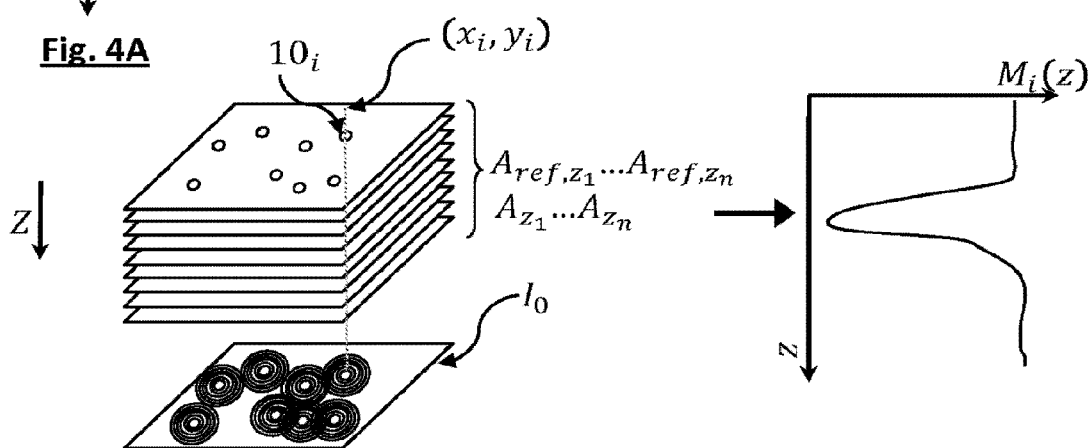
Fig. 4C

OPTICAL METHOD FOR ESTIMATING A REPRESENTATIVE VOLUME OF PARTICLES PRESENT IN A SAMPLE BASED ON A SIZE OF EACH REGION OF INTEREST

TECHNICAL FIELD

The technical field of the invention is the estimation of a representative volume of particles in a liquid sample, comprising in particular a biological liquid. One intended application is estimation of the mean volume of red blood cells in a blood sample.

PRIOR ART

Many developments have taken place in recent years in the field of lens-free imaging for biological applications. The principles of lens-free imaging have been described in the document WO2008090330, which relates to a device for the observation of samples comprising cells by lens-free imaging. The sample is arranged between a light source and an image sensor, without arranging an optical magnification lens between the sample and the image sensor. Thus, the image sensor collects an image of a light wave emitted by the sample. This image, also referred to as a hologram, is formed by patterns of interference between the light wave emitted by the light source, and transmitted by the sample, and diffraction waves resulting from the diffraction by the sample of the light wave emitted by the light source. These interference patterns are generally composed of a succession of concentric rings. They are sometimes referred to as diffraction patterns. Images are thus acquired, the observation field of which is much larger than that of a microscope. When the concentration of cells of the sample is low enough, an interference pattern may be associated with each cell; counting these makes it possible to count the cells present in the sample. However, the hologram does not allow reliable counting of the cells when the concentration increases.

In order to take this limitation into account, holographic reconstruction algorithms have been developed, allowing better characterization of the biological cells observed by lens-free imaging. For example, Patent Application WO2016151248 describes a method which is based on the acquisition of an image by a lens-free imaging device and makes it possible to identify a blood cell.

Work has also been carried out with the aim of estimating the volume of blood cells, and in particular red blood cells. The publication Roy M. et al., "Low-cost telemedicine device performing cell and particle size measurement based on lens-free shadow imaging technology", Biosensors and Bioelectronics 67 (2015) 715-723 describes a method for estimating the volume of red blood cells on the basis of analyzing the diffraction patterns formed on an image acquired by an image sensor. Implementation of such a method is difficult to carry out with a high concentration of red blood cells. This is because the diffraction patterns become superimposed when the concentration increases, making it difficult to characterize them accurately. This method is thus mainly intended for very dilute blood samples.

The publication Seo S et al., "High-Throughput lens-free blood analysis on a chip", Anal Chem. 2010 Jun. 1; 82(11): 4621-4627 proposes a method based on holographic reconstruction of an image acquired by an image sensor in a lens-free imaging configuration. The holographic reconstruction is intended to obtain a reconstructed image representative of the phase of the light wave propagating between the blood sample analyzed and the image sensor. The reconstructed image has a greatly improved resolution compared with the image acquired by the image sensor, and analyzing it makes it possible to estimate the volume of red blood cells present in the sample. The reconstructed phase image makes it possible to estimate an area of each red blood cell, while the value of the phase constitutes an indicator of their thickness. Each red blood cell is thus assigned an area and a phase value, the volume being estimated by the product of the area and the thickness, which is deduced from the measured phase by making an assumption about the value of the refractive index.

Other than in lens-free imaging, holographic imaging may be used to characterize particles. For example, the publication Memmolo P. "3D Morphometry of red blood cells by digital holography" describes a device of the Mach-Zehnder interferometer type for characterizing the shape of particles taken individually. To this end, each particle analyzed is trapped by an optical trap. A plurality of images of each particle are acquired by using a defocused optical system and by setting the particle in rotation. The acquired images are subjected to holographic reconstruction. Information is thus obtained relating to the morphology of the particle analyzed. However, the use of such a device cannot be envisioned when the intention is to characterize a large number of particles simultaneously.

The publication Kim Y. "Isovolumetric Sphering of Erythrocytes for more accurate and precise cell volume measurement by flow cytometry" describes a device for characterizing blood particles by cytometry. This publication describes the use of diffraction patterns for evaluating a distortion of a cell. It also describes the formation of an image using a conventional microscopy configuration in order to evaluate the dimensions of a plurality of particles.

The Inventors of the present invention have observed that existing the methods have limitations, in particular associated with the position of the red blood cells in the sample and/or with their orientations. They propose a more reliable and less restrictive method for estimating a characteristic volume of blood particles, and in particular red blood cells. The invention makes it possible, in particular, to estimate the mean volume of red blood cells.

SUMMARY OF THE INVENTION

A first subject of the invention is a method for estimating a representative volume of particles of interest immersed in a sample, or for estimating a dispersion of the volume of said particles, the sample extending in at least one plane, referred to as the sample plane, the sample comprising a sphering agent capable of modifying the shape of the particles, the method comprising the following steps:
  a) illuminating the sample with the aid of a light source, the light source emitting an incident light wave propagating toward the sample along a propagation axis;
  b) acquiring an image of the sample with the aid of an image sensor, the image being formed in a detection plane, the sample being arranged between the light source and the image sensor, each image being representative of a light wave, referred to as an exposure light wave, to which the image sensor is exposed under the effect of the illumination;
  c) using the image of the sample, acquired during step b), and a holographic propagation operator in order to calculate a complex expression of the exposure light wave at various positions distant from the detection plane;

the method comprising a step of estimating a representative volume of the particles of interest as a function of the complex expressions calculated during step c), or an index quantifying a dispersion of the volumes of the particles of interest of the sample.

The representative volume characterizes the particles of interest. It may be a mean volume of the particles of interest or a median volume of the particles of interest, or alternatively a volume of each particle of interest taken individually. In the last case, the invention makes it possible to obtain a distribution of the volumes interest. It may also be the total volume of particles in the sample.

According to a first embodiment, the representative volume of the particles of interest is estimated by calculating the complex image corresponding to a distribution of the complex expression of the exposure light wave in the plane in which the sample extends, which is preferably parallel to the detection plane. Such an embodiment allows simple estimation of a representative volume of the particles interest on the basis of an assumption of sphericity of each particle of interest, an assumption which is legitimate in view of the sphering step. According to this first embodiment, the method may comprise forming a complex image in the sample plane. It may also comprise:

detecting of regions of interest on the basis of the complex image, each region of interest being associated with a particle of interest;

determining a size of each region of interest;

the estimation of the representative body of the particles of interest being carried out as a function of said size, each particle of interest being assumed to be spherical.

According to a second embodiment, the representative volume of the particles of interest is estimated by calculating a complex expression of the exposure light wave at various distances from the detection plane. Such an embodiment is robust in relation to the particles of interest in the sample. This embodiment may comprise the following steps:

d) determining respective planar positions of plurality of particles of interest in a plane parallel to the detection plane, each planar position being associated with one particle of interest;

e) on the basis of the complex expressions calculated during step c), calculating at least one characteristic quantity of the exposure light wave at each planar position and at a plurality of distances from the detection plane;

f) forming a profile representing a variation of the characteristic quantity calculated during step e) along an axis which is parallel to the propagation axis and passes through each planar position determined during step d), each profile being associated with one particle of interest;

g) estimating a representative volume of the particles of interest as a function of the profiles formed during step f).

According to this embodiment, step c) preferably comprises forming a stack of complex images, each complex image forming a distribution of the complex expression of the exposure light wave over a reconstruction plane. Each reconstruction plane is preferably parallel to the detection plane. The formation of the stack of complex images may comprise the following substeps:

ci) on the basis of each image acquired during step b), applying a propagation operator so as to calculate a complex image, referred to as the reference image, representative of the exposure light wave in a reference plane;

cii) applying a propagation operator to the reference image so as to obtain complex images, referred to as secondary complex images, at various distances from the reference plane along the propagation axis, the secondary complex images and the reference image forming the stack of complex images.

The reference plane may be the sample plane.

The formation of the stack of complex images may comprise calculating, on the basis of the acquired image, a plurality of complex images at various distances from the detection plane along the propagation axis.

In one embodiment, during step d), the planar position of each particle of interest is determined on the basis of a complex image of the stack of complex images. Step d) then comprises the following substeps:

di) detecting particles in the complex image;

dii) selecting particles of interest among the particles detected.

According to one embodiment, step e), the characteristic quantity comprises the modulus or the phase of a complex expression of the exposure light wave.

According to one embodiment, the representative volume of the particles of interest is a mean volume of said particles. During step g), the mean volume of the particles of interest is estimated by applying a metric to each profile formed during step f), so as to obtain a parameter for each profile, and by calculating a mean of the parameters of each profile.

According to one embodiment, in which the representative volume of the particles of interest is a mean volume of said particles, when the particles of interest are red blood cells, the mean volume of the particles of interest corresponds to a mean cellular volume of the sample.

According to one embodiment, the method comprises establishing a parameter representing a dispersion of the volumes of the particles of interest. It may also comprise determining a distribution index of the red blood cells.

According to one embodiment, the method comprises determining a quantity of particles of interest in the sample. When the particles of interest are red blood cells, the method may comprise a step of determining a hematocrit the basis of the mean volume of the particles of interest and the quantity of particles of interest in the sample.

A second subject of the invention is a device for estimating the representative volume of particles of interest arranged in a sample, the device comprising:

a light source capable of emitting an incident light wave propagating toward the sample;

a support configured to keep the sample between the light source and an image sensor;

a processor configured to receive an image of the sample acquired by the image sensor and to carry out at least step c) of the method according to the first subject of the invention, the processor being configured to estimate the representative volume of the particles of interest on the basis of the complex expressions calculated during step c). The processor may be configured to carry out steps d) to g) described in connection with the first subject of the invention.

Other advantages and characteristics will emerge more clearly from the following description of particular embodiments of the invention, which are given by way of nonlimiting examples and are represented in the figures listed below.

FIGURES

Figure 3A:
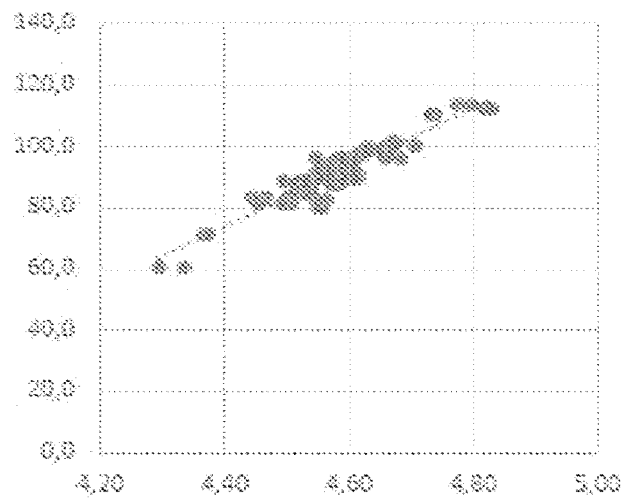
Figure 3B:
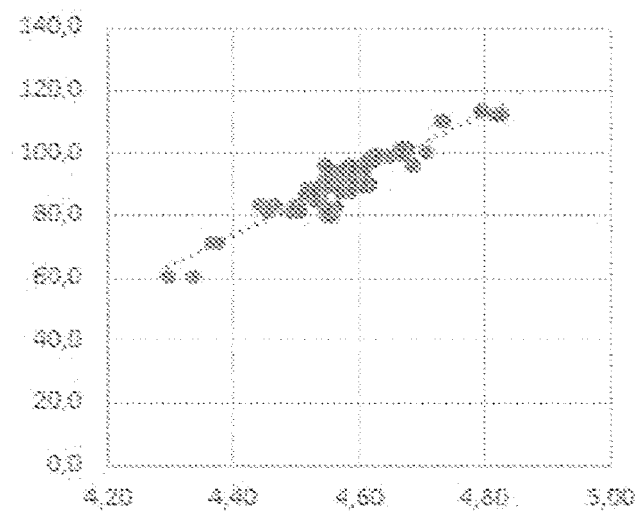
Figure 3C:
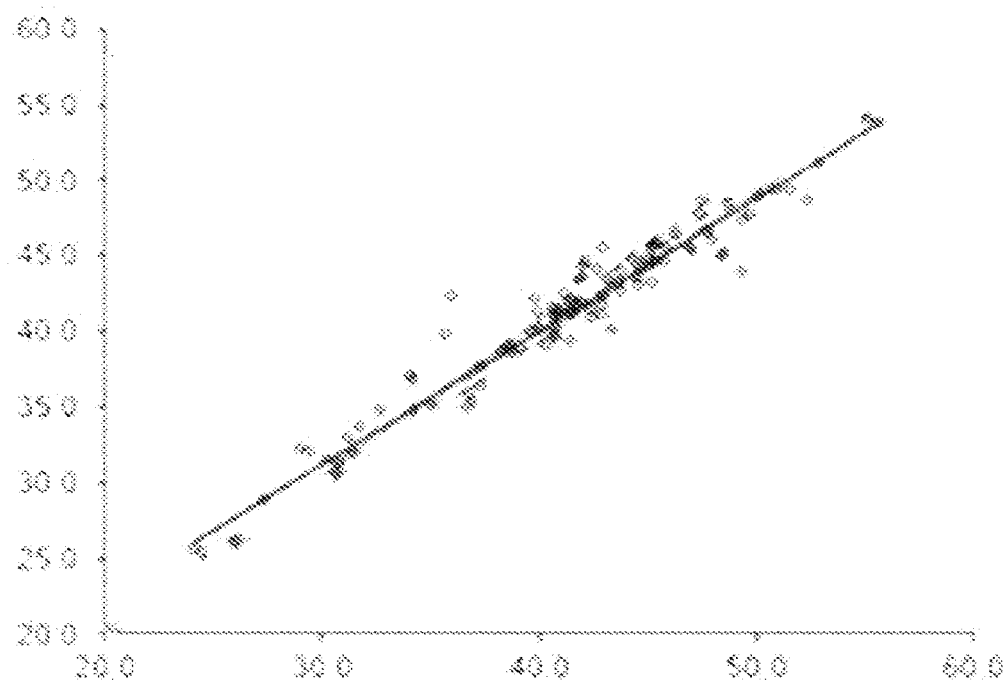
Figure 3D:
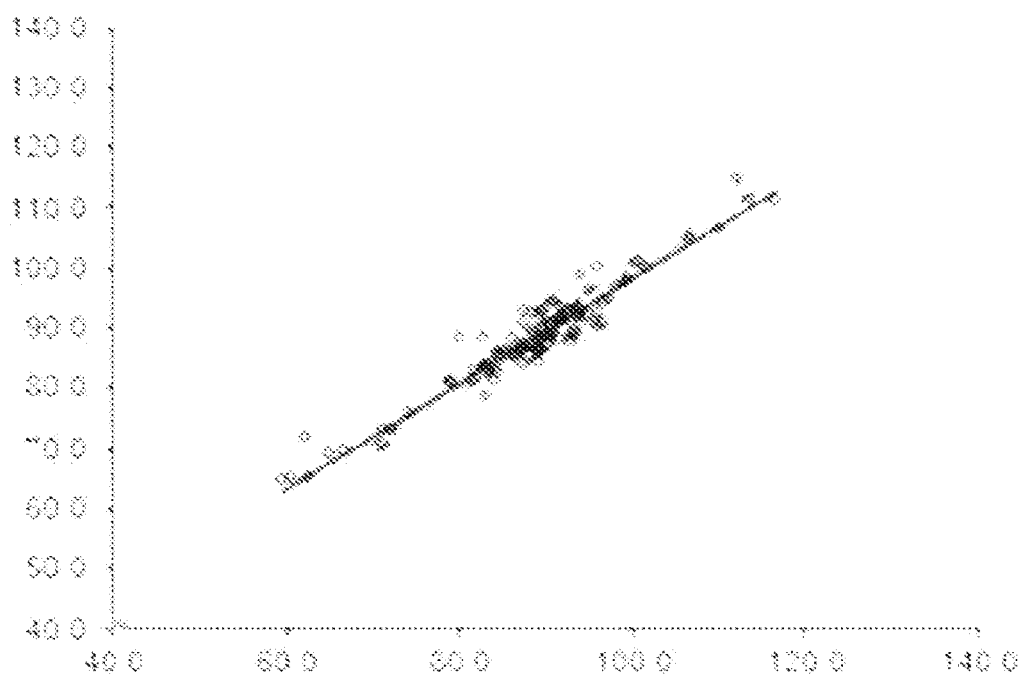
Figure 3E:
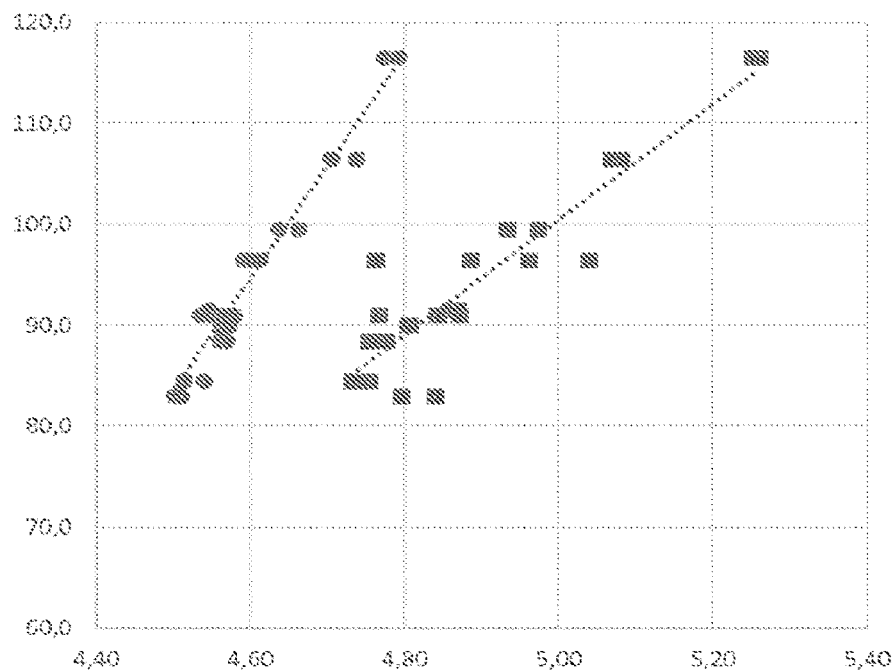
Figure 3F:
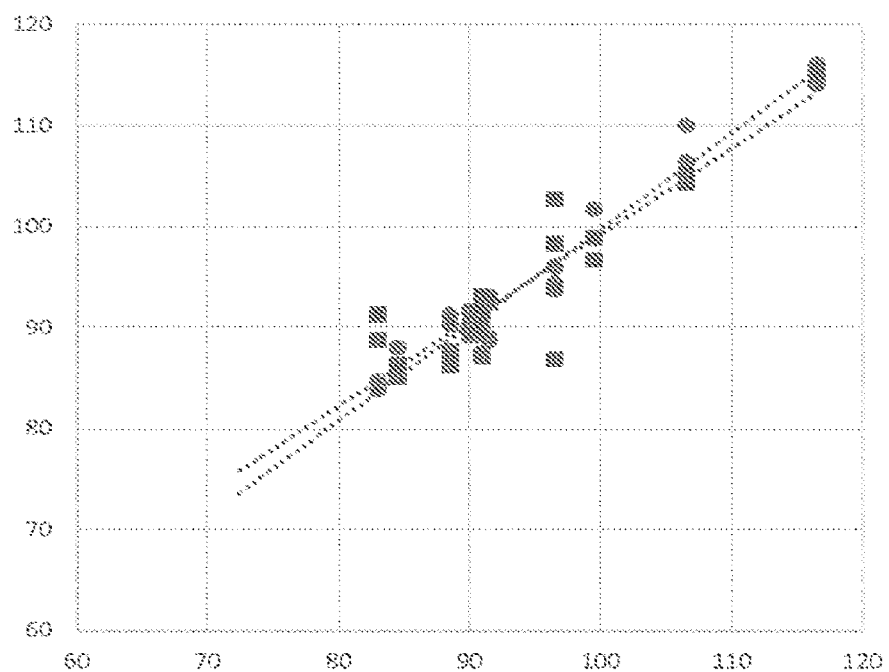

FIGS. 3A and 3B represent estimates of the size of the red blood cells obtained by using the first embodiment. FIG. 3C illustrates a comparison between the mean cellular volumes of blood samples respectively estimated according to the first embodiment of the invention and according to a reference method. FIG. 3D illustrates a comparison between the hematocrits of various samples, respectively estimated according to the first embodiment of the invention and according to a reference method. FIG. 3E illustrates the establishment of a calibration of the first embodiment, with and without use of a sphering agent. Each calibration aims to establish a relationship between a dimension given by the first embodiment and a mean cellular volume obtained by a reference method. FIG. 3F shows a comparison between the mean cellular volume respectively using a reference method and the first embodiment, with and without use of a sphering agent.

FIG. 4A illustrates the main steps of a second embodiment of the invention.

FIG. 4B details step 210 of FIG. 4A in a particular embodiment. FIG. 4C schematizes certain steps mentioned in FIG. 4A.

Figure 4D:
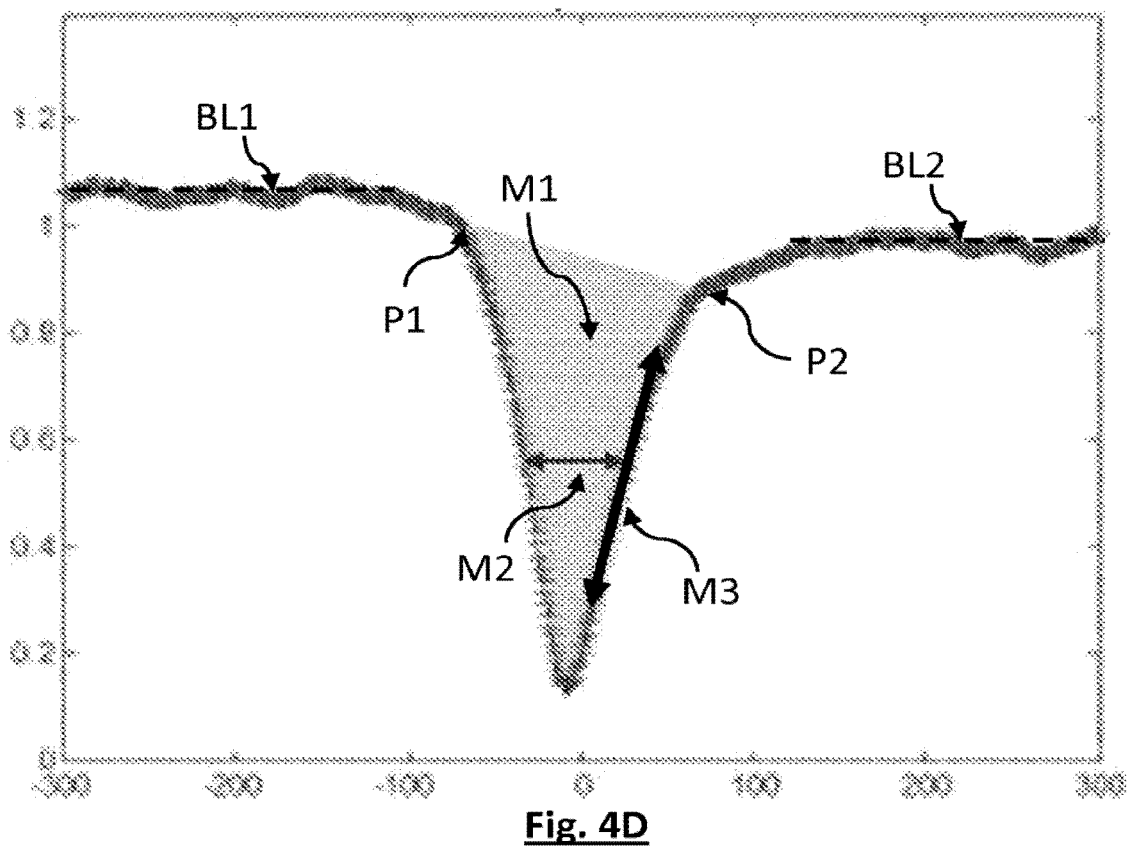
Figure 4E:
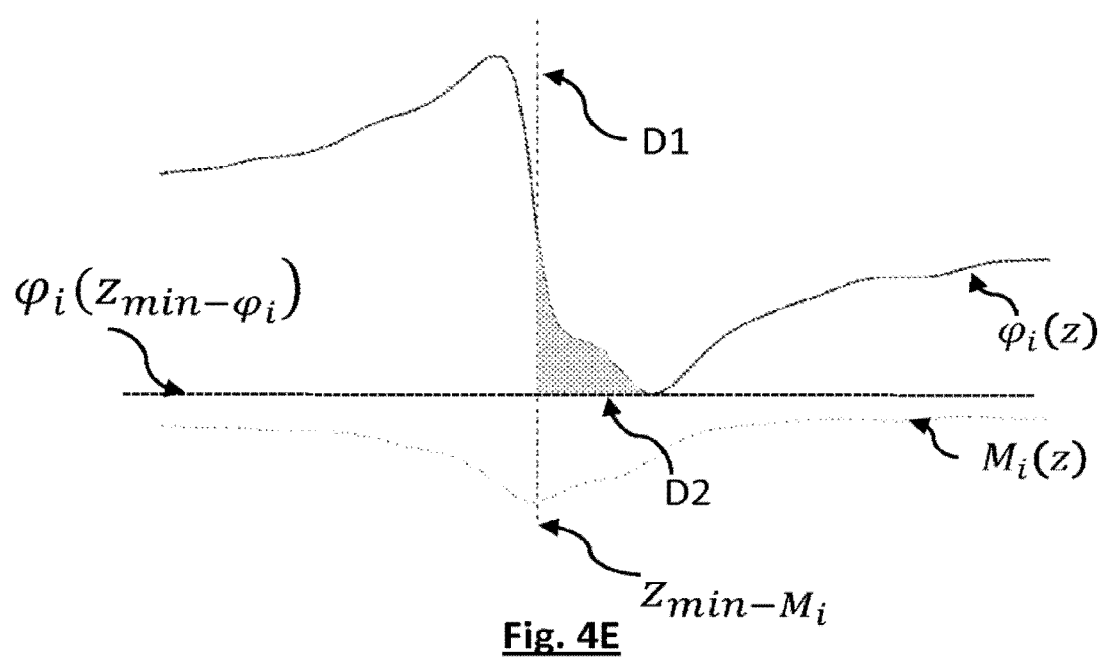

FIGS. 4D and 4E show examples of metrics applied to profiles.

Figure 5A:
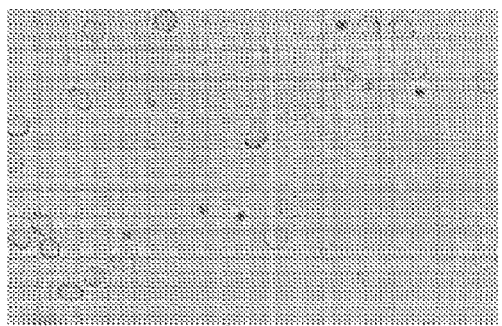
Figure 5B:
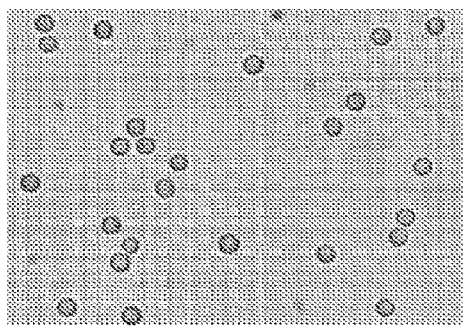

FIGS. 5A and 5B are microscope images of a blood sample respectively with and without a sphering agent.

Figure 5C:
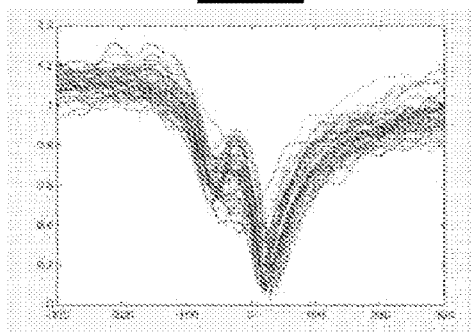
Figure 5D:
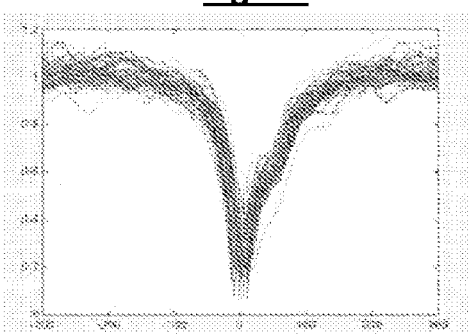
Figure 5E:
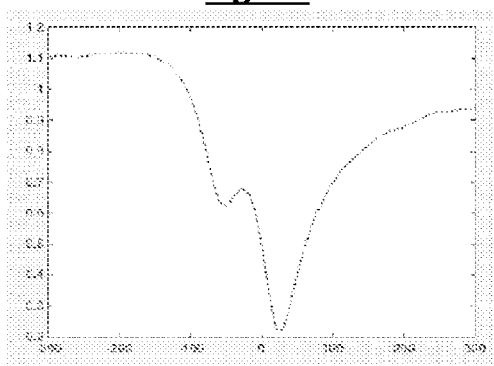
Figure 5F:
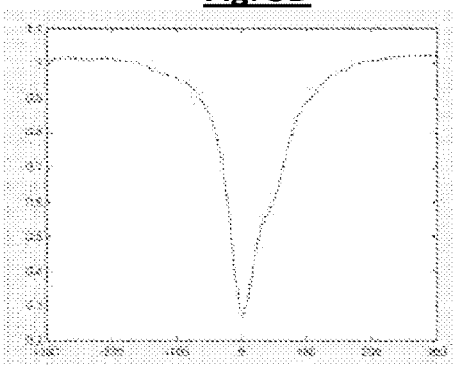

FIGS. 5C and 5D show profiles of the modulus of a complex expression obtained by holographic reconstruction on the basis of an image formed by the image sensor of the device. Each profile of FIG. 5C corresponds to a red blood cell without addition of a sphering agent to the sample analyzed. Each profile of FIG. 5D corresponds to a red blood cell with addition of a sphering agent to the sample analyzed. FIGS. 5E and 5F represent mean profiles calculated respectively on the basis of the profiles represented in FIGS. 5C and 5D.

Figure 5G:
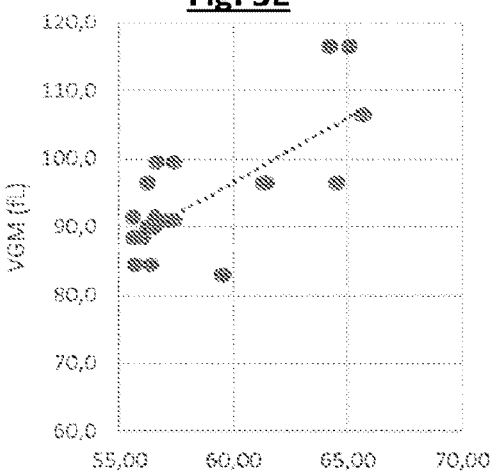
Figure 5H:
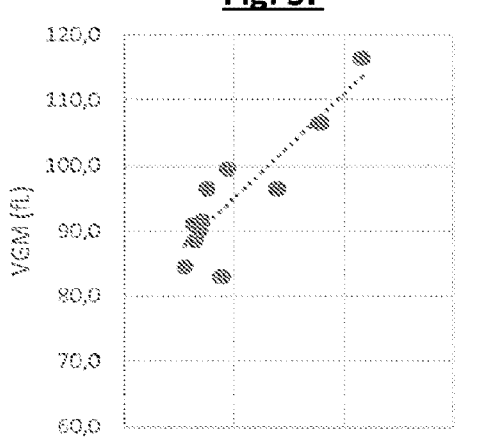

FIGS. 5G and 5H represent, for various samples comprising blood, the mean cellular volume of each sample, expressed in femtoliters, as a function of a mean of metrics calculated over profiles corresponding to red blood cells of said samples. The samples used to obtain FIG. 5G do not comprise a sphering agent. The samples used to obtain FIG. 5H comprise a sphering agent.

Figure 5I:
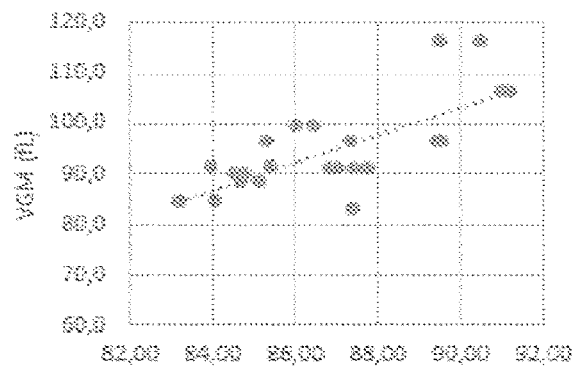
Figure 5J:
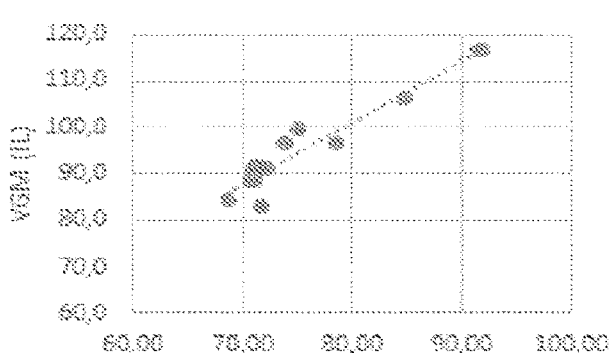

FIGS. 5I and 5J represent, for various samples comprising blood, the mean cellular volume of each sample, expressed in femtoliters, as a function of a mean of metrics calculated over profiles corresponding to red blood cells of said samples. The samples used to obtain FIG. 5I do not comprise a sphering agent. The samples used to obtain FIG. 5J comprise a sphering agent.

Figure 6A:
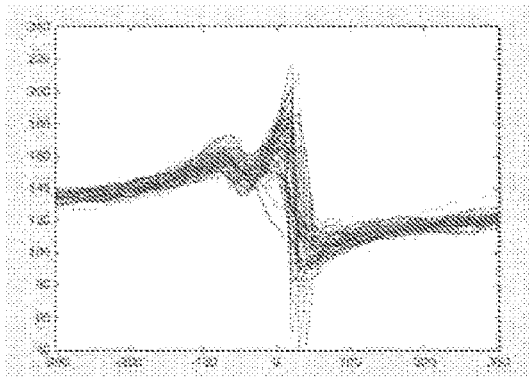
Figure 6B:
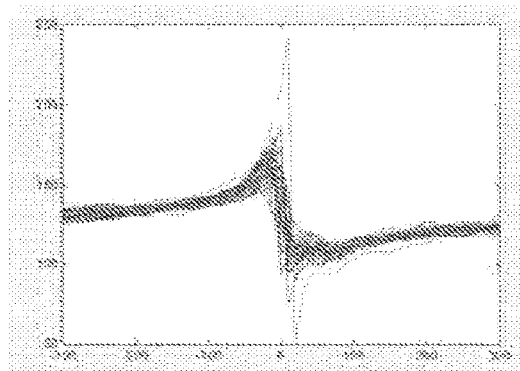
Figure 6C:
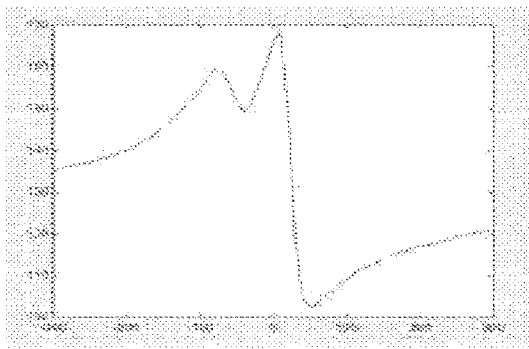
Figure 6D:
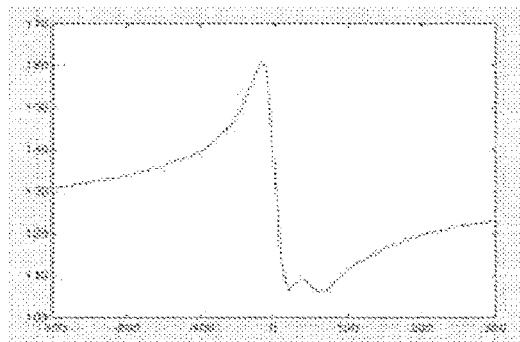

FIGS. 6A and 6B show profiles of the phase of a complex expression obtained by holographic reconstruction on the basis of an image formed by the image sensor of the device. Each profile of FIG. 6A corresponds to a red blood cell without addition of a sphering agent to the sample analyzed. Each profile of FIG. 6B corresponds to a red blood cell with addition of a sphering agent to the sample analyzed. FIGS. 6C and 6D represent mean profiles calculated respectively on the basis of the profiles represented in 6A and 6B.

Figure 7A:
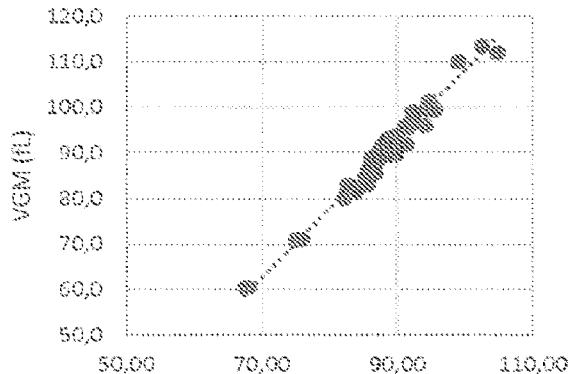
Figure 7B:
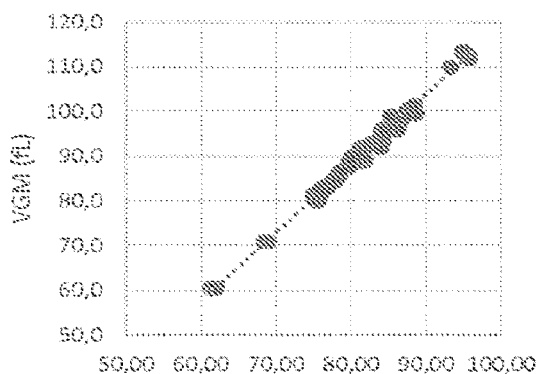
Figure 7C:
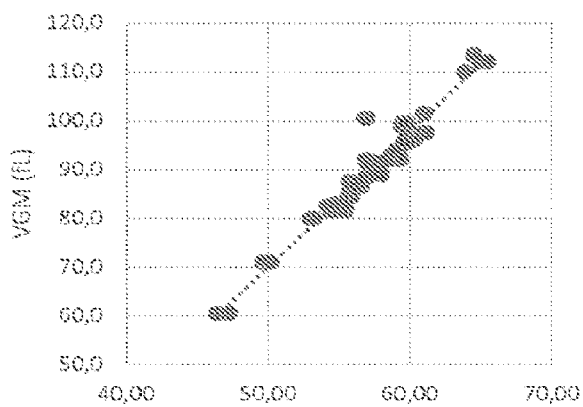
Figure 7D:
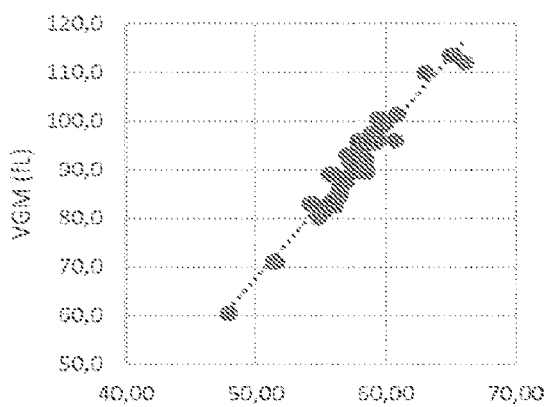
Figure 7E:
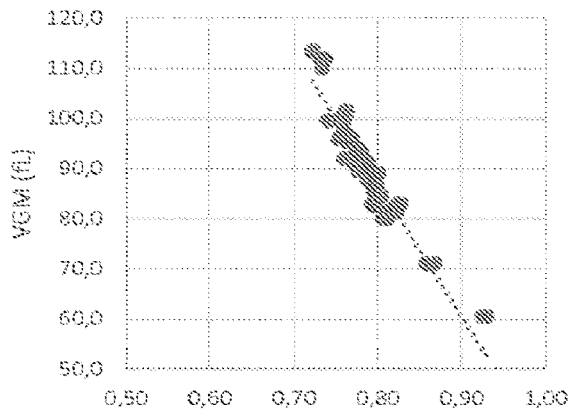
Figure 7F:
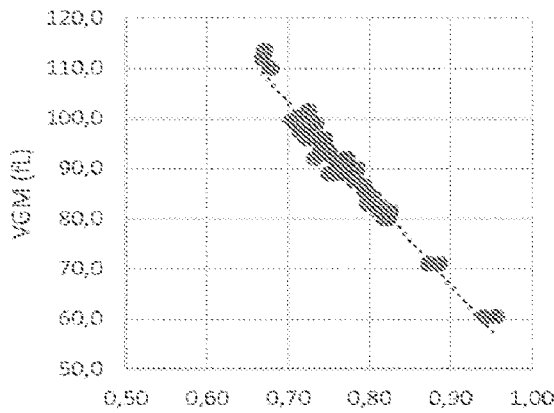

FIGS. 7A to 7F represent, for various samples comprising blood, the mean cellular volume of each sample, expressed in femtoliters, as a function of a mean of metrics calculated over profiles corresponding to red blood cells of the samples. FIGS. 7A, 7C and 7E were obtained on the basis of a stack of complex images in which each complex image results from application of a holographic propagation operator on the basis of the image acquired by the image sensor. FIGS. 7B, 7D and 7F were obtained on the basis of a stack of complex images in which each complex image results from the application of a holographic propagation operator to complex reference image, the complex reference image having been obtained by applying a holographic projection operator on the basis of the image acquired by the image sensor.

Figure 8A:
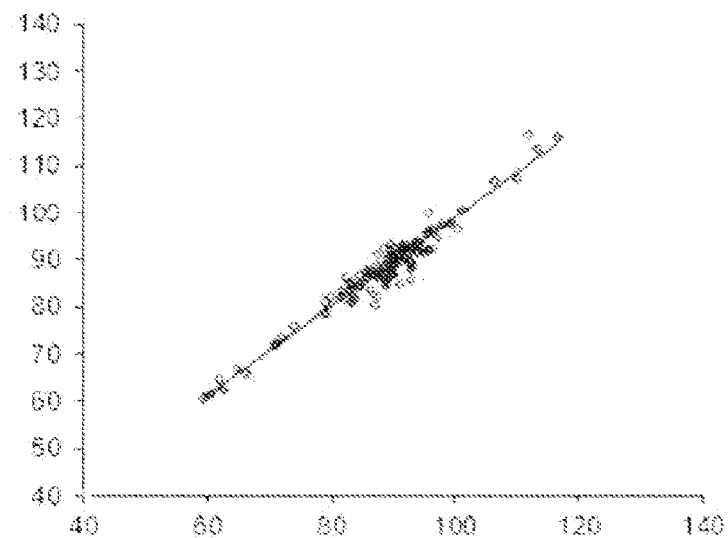
Figure 9A:
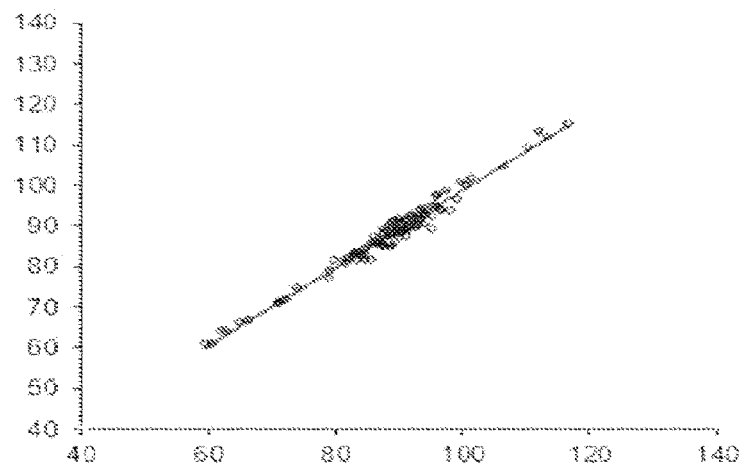

FIGS. 8A and 9A illustrate comparisons between the mean cellular volumes respectively estimated according to the second embodiment of the invention and according to a reference method. In FIG. 8A, a first metric was used; in FIG. 9A, a second metric was used.

Figure 8B:
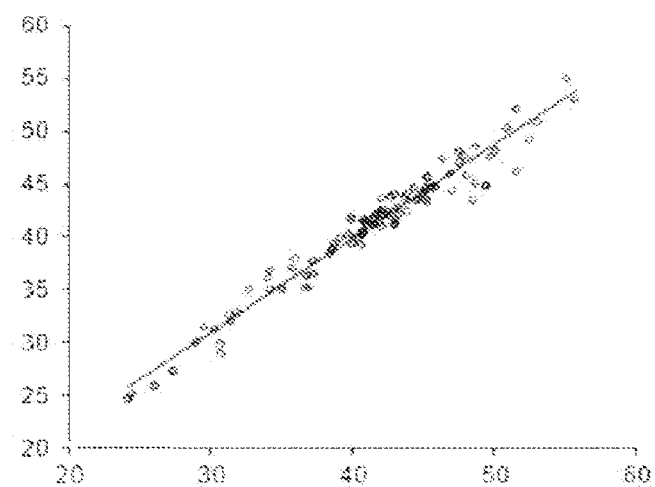
Figure 9B:
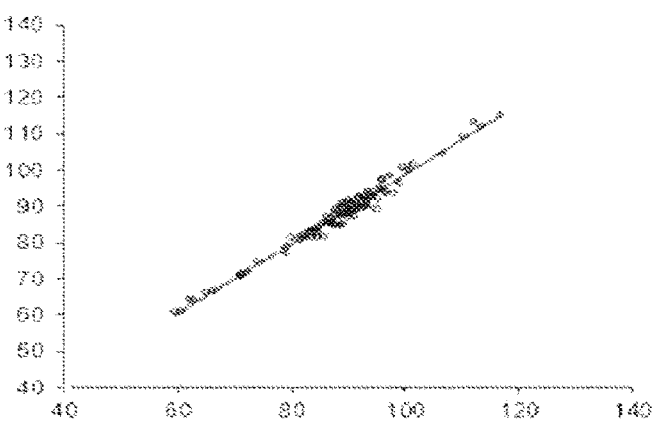

FIGS. 8B and 9B illustrate comparisons between the hematocrits of various samples, respectively estimated according to the second embodiment of the invention and according to a reference method. In FIG. 8B, a first metric was used; in FIG. 9B, a second metric was used.

Figure 8C:
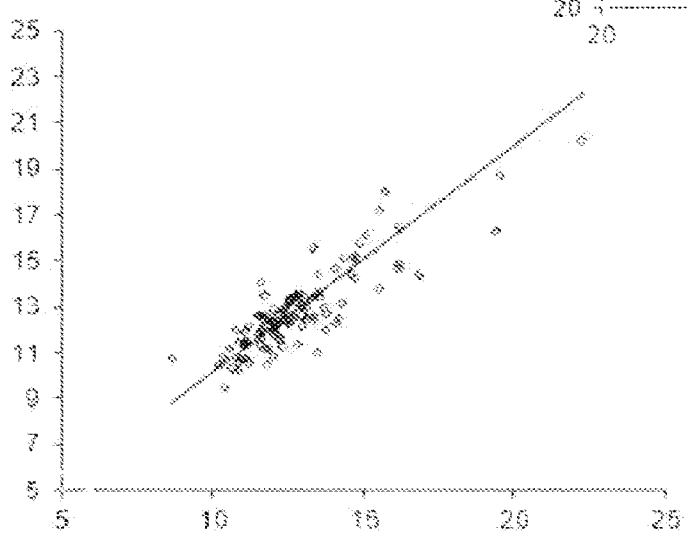
Figure 9C:
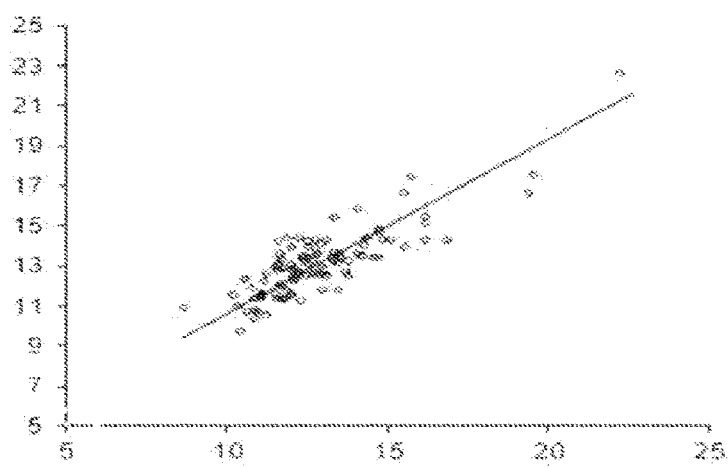

FIGS. 8C and 9C illustrate comparisons between the volume distribution index of the red blood cells of various samples, respectively estimated according to the second embodiment of the invention and according to a reference method. In FIG. 8C, a first metric was used; in FIG. 9C, a second metric was used.

Figure 10A:
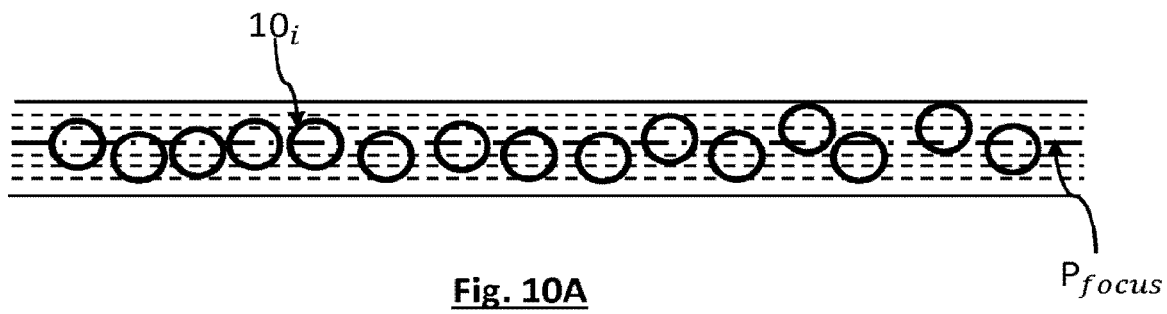

FIG. 10A represents various reconstruction planes arranged on either side of a focal plane.

Figure 10B:
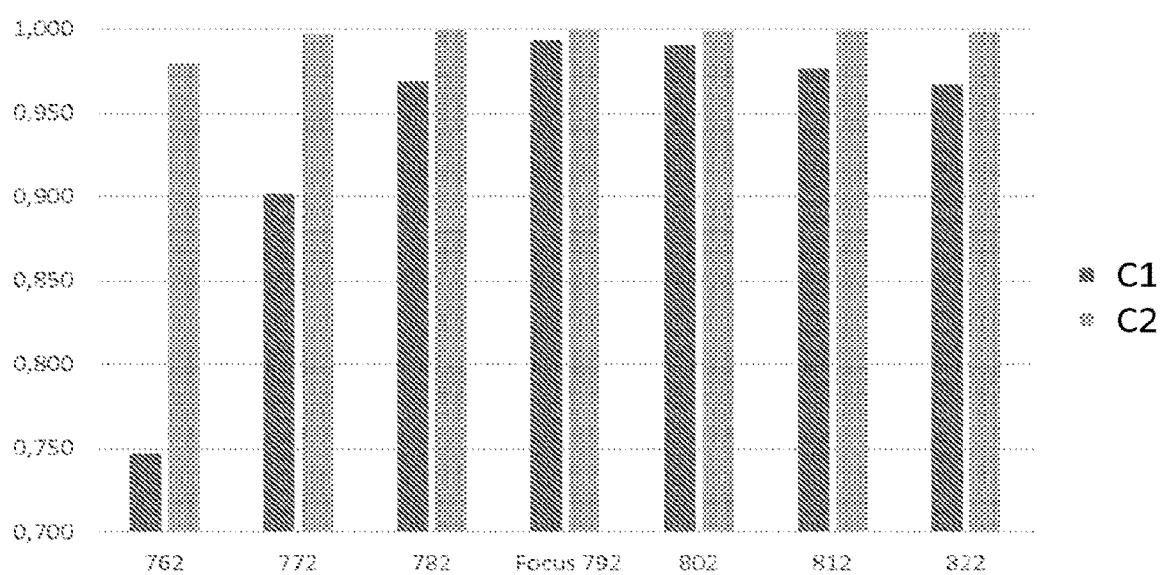

FIG. 10B represents a comparison of correlation proficiency calculated between:
 mean cellular volumes estimated by a reference method;
 mean cellular volumes respectively estimated by the first embodiment and by the second embodiment.

The comparison is carried out by modifying the position of a focal plane in which the majority of the particles of the sample extend.

DESCRIPTION OF PARTICULAR EMBODIMENTS

Figure 1:
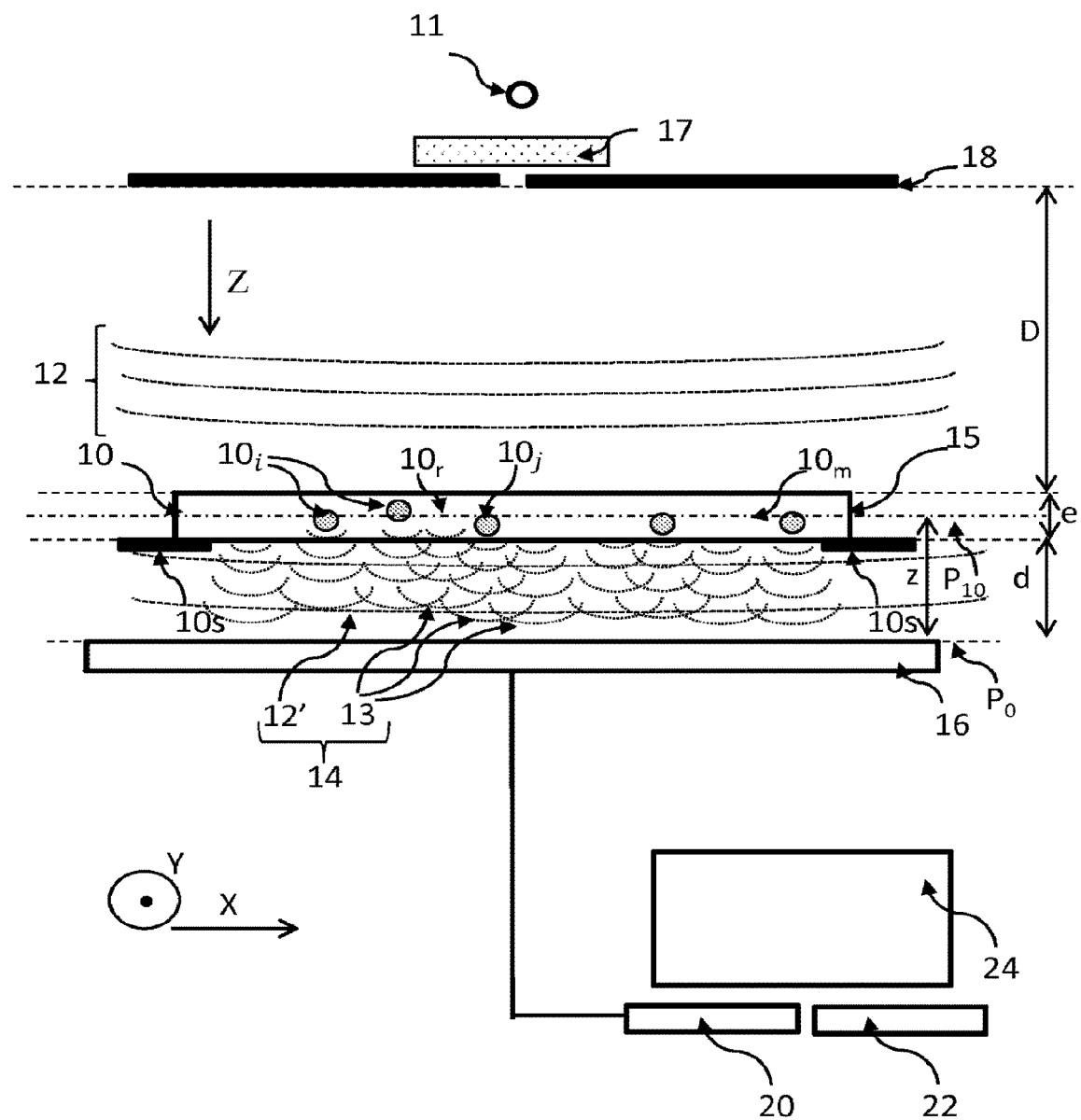
FIG. 1 represents an example of the device according to the invention.

FIG. 1 represents an example of a device according to the invention. A light source 11 is capable of emitting a light wave 12, referred to as the incident light wave, propagating in the direction of the sample 10 along a propagation axis Z. The light wave is emitted with an illumination spectral band $\Delta\lambda$.

The sample 10 is a sample that is intended to be characterized. It comprises in particular a liquid medium $10_m$ in which particles, referred to as particles of interest $10_i$, are immersed. The medium $10_m$ may be a buffer liquid. It may also comprise a body fluid in the pure or diluted state. The term body fluid is intended to mean a liquid generated by a living body. It may in particular, without limitation, be blood, urine, cerebrospinal fluid, sperm, lymph. A particle is intended in particular to mean a cell, for example a blood cell, a microorganism, for example a bacterium. The invention applies in particular to a particle of interest that has a nonspherical shape in its normal state. In the examples described below, the particles of interest are red blood cells.

The sample also comprises a so-called sphering agent $10_r$ capable of modifying the surface tension of the membrane delimiting the particles. Under the effect of such an agent, the particles of interest $10_i$ assume a spherical shape, or approximate the shape of a sphere. Thus, the particles of interest $10_i$ are sufficiently flexible and deformable so that their morphology can be modified under the action of such an agent. The use of sphering agents to deform red blood cells is known, and has been described in cytometry applications in documents U.S. Pat. Nos. 5,633,167, 8,837,803 or 5,284,771. Such agents make it possible to modify the shape of a red blood cell. It may in particular be a surfactant, for example a zwitterionic surfactant. It may for example be a derivative of glycine betaine, for example an alkyl betaine, or an alkylamido betaine (for example cocamidopropyl betaine, CAPB), an alkyl maltoside, an alkyl glucamide. It may be 3-(N,N-dimethyldodecylammonio)propanesulfonate. The sphering agent $10_r$ is preferably diluted in a neutral or isotonic buffer solution, for example phosphate buffer, usually referred to by the acronym PBS (Phosphate Buffer Saline). The person skilled in the art may adapt the dilution factor so that the sphering reagent deforms the particles of interest $10_i$ sufficiently without lysing them. The sphering agent concentration is typically between 50 mg/l and 300 mg/l, preferably 100 mg/l. The sample may comprise total blood diluted in the sphering agent solution by a dilution factor of preferably between 1/400 and 1/1200.

In this example, the sample 10 is contained in a fluidic chamber 15. The fluidic chamber 15 is, for example, a fluidic chamber of the Countess® type with a thickness e=100 µm. The thickness e of the fluidic chamber 15, and therefore of the sample 10, along the propagation axis typically varies between 10 µm and 1 cm, and is preferably between 20 µm and 500 µm. The sample extends in a plane $P_{10}$, referred to as the sample plane, perpendicular to the propagation axis Z. It is held on a support $10s$ at a distance d from an image sensor 16.

The sphering reagent is added to the sample before introduction into the fluidic chamber 15. It may also be added after this introduction or during this introduction, for example by being present in the dry state in the fluid chamber 15. The sphering agent concentration in the sample is adapted by the person skilled in the art according to the sample used.

The sample may comprise particles $10_j$ other than the particles of interest $10_i$ that are intended to be analyzed. In this case, the method comprises a step of selecting the particles of interest $10_i$ from among the particles. This step is described below.

The distance D between the light source 11 and the sample 10 is preferably more than 1 cm. It is preferably between 2 and 30 cm. Advantageously, as seen by the sample, the light source is considered to be a point light source. This means that its diameter (or its diagonal) is preferably less than one tenth, more preferably than one hundredth, of the distance between the sample and the light source. In FIG. 1, the light source is a light-emitting diode. It is generally associated with a pinhole 18, or spatial filter. The aperture of the pinhole is typically between 5 µm and 1 mm, preferably between 50 µm and 500 µm. In this example, the pinhole is provided by Thorlabs under the reference P150S, and its diameter is 150 µm. According to another configuration, the pinhole may be replaced with an optical fiber, of which a first end is placed in front of the light source 11 and a second end is placed next to the sample 10. The device represented in FIG. 1 also comprises a diffuser 17 arranged between the light source 11 and the pinhole 18. The use of such a diffuser makes it possible to overcome constraints of centering the light source 11 relative to the aperture of the pinhole 18. The function of such a diffuser is to distribute the light rays produced by an elementary light source 11 in a cone of angle α. Preferably, the diffusion angle α varies between 10° and 80°. As an alternative, the light source may be a laser source such as a laser diode. In this case, there is no need to associate a spatial filter or diffuser with it.

Preferably, the spectral emission band Δλ of the incident light wave 12 has a width of less than 100 nm. The width of a spectral band is intended to mean a full-width at half-maximum of said spectral band.

According to one embodiment, the light source 11 comprises a plurality of elementary light sources $11_k$, each being capable of emitting an incident light wave $12_k$ in a spectral band $\Delta\lambda_k$. Preferably, the spectral bands $\Delta\lambda_k$ of the various light sources $11_k$ are different to one another.

The sample 10 is arranged between the light source 11 and the image sensor 16 mentioned above. The latter preferably extends parallel or substantially parallel to the plane $P_{10}$ in which the sample extends. The term substantially parallel means that the two elements may not be strictly parallel, an angular tolerance of a few degrees, less than 20° or 10°, being allowed. In this example, the sample extends in a plane XY perpendicular to the propagation axis Z.

The image sensor 16 is capable of forming an image $I_0$ in a detection plane $P_0$. In the example represented, it is an image sensor comprising a matrix of pixels of the CCD type, or a CMOS. The detection plane $P_0$ preferably extends perpendicularly to the propagation axis Z of the incident light wave 12. The distance d between the fluidic chamber 15 and the matrix of pixels of the image sensor 16 is preferably between 50 µm and 2 cm, preferably between 100 µm and 2 mm.

In this embodiment, the absence of optics for magnification or image formation between the image sensor 16 and the sample 10 may be noted. This does not prohibit the possible presence of focusing microlenses at each pixel of the image sensor 16, these not having the function of magnifying the image acquired by the image sensor, their function being to optimize the detection efficiency.

Under the effect of the incident light wave 12, the particles present in the sample may generate a diffracted wave capable of producing interference in the detection plane $P_0$, in particular with a part 12', transmitted by the sample, of the incident light wave. Furthermore, the sample may absorb a part of the incident light wave 12. Thus, the light wave 14 which is transmitted by the sample and to which the image sensor 16 is exposed, referred to by the term "exposure wave", may comprise:
 a component 13 resulting from the diffraction of the incident light wave 12 by each particle of the sample;
 a component 12' resulting from the transmission of the incident light wave 12 by the sample, part of which may be absorbed in the sample.

These components form interference in the detection plane $P_0$. The image $I_0$ acquired by the image sensor also comprises interference patterns (or diffraction patterns), it being possible to associate each interference pattern with a particular sample.

A processor 20, for example a microprocessor, is capable of processing each image $I_0$ acquired by the image sensor 16. In particular, the processor is a microprocessor connected to a programmable memory 22, in which a sequence of instructions for carrying out the image-processing and calculation operations described in this description is stored. The processor may be coupled to a screen 24 displaying images acquired by the image sensor 16 or calculated by the processor 20.

An image $I_0$ acquired by the image sensor 16, also referred to as a hologram, does not make it possible to obtain a sufficiently precise representation of the sample observed.

As described in connection with the prior art, a holographic propagation operator h may be applied to each image acquired by the image sensor, so as to calculate a complex quantity A representing the exposure light wave 14 at any point with coordinates (x,y,z) in space, and particularly in a reconstruction plane $P_z$ located at a distance |z|, referred to as the reconstruction distance, from the image sensor 16. The reconstruction plane is preferably the plane $P_{10}$ in which the sample extends, with:

$A(x,y,z) = I_0 (x,y,z) \cdot h$, the symbol · denoting the convolution operator.

The function of the propagation operator h is to describe the propagation of light between the image sensor 16 and a point with coordinates (x,y,z), located at a distance |z| from the image sensor. The complex expression A of the light wave 14, at any point with coordinates (x,y,z) in space is such that: $A(x,y,z) = M(x,y,z)e^{j\varphi(x,y,z)}$ (3). It is possible to determine the modulus $M(x,y,z)$ and/or the phase $\varphi(x,y,z)$ of the light wave 14 at the distance |z|, with:

$M(x,y,z) = \text{abs}[A(x,y,z)]$;

$\varphi(x,y,z) = \arg[A(x,y,z)]$.

The operators abs and arg respectively denote the modulus and the argument.

In the rest of this description, the coordinates (x,y) denote a planar position in a radial plane XY perpendicular to the propagation axis Z. The coordinate z denotes a cornet along the propagation axis Z.

The complex quantity A is a complex quantity whose argument and modulus are respectively representative of the phase and the amplitude of the exposure light wave 14 detected by the image sensor 16. The combination of the image $I_0$ with the propagation operator h makes it possible to obtain a complex image $A_z$ representing a spatial distribution of the complex expression A in a reconstruction plane $P_z$ extending at a distance |z| from the detection plane $P_0$. In this example, the detection plane $P_0$ has the equation z=0. The complex image $A_z$ corresponds to a complex image of the sample in the reconstruction plane $P_z$. It also represents a two-dimensional spatial distribution of the complex expression A describing the exposure wave 14. Such a method, referred to by the term holographic construction, makes a possible in particular to reconstruct an image $M_z$ of the modulus or an image $\varphi_z$ of the phase of the complex expression describing the exposure light wave 14 in the reconstruction plane. The image of the modulus or of the phase of the exposure light wave 14 is respectively obtained according to the following expressions:

$M_z = \text{mod}(A_z)$ and $\varphi_z = \arg(A_z)$.

The propagation operator is for example the Fresnel-Helmholtz function, such that:

$$h(x, y, z) = \frac{1}{j\lambda z} e^{j2\pi \frac{z}{\lambda}} \exp\left(j\pi \frac{x^2 + y^2}{\lambda z}\right).$$

The propagation of an image $I_0$ acquired by an image sensor has already been described in the publication Seo 2010 cited in the prior art. In this publication, an image of the phase of the exposure light wave 14 is reconstructed in a plane parallel to the detection plane. The area of each red blood cell in the phase image is detected by a thresholding algorithm. It is then multiplied by the value of the thickness, which is obtained by dividing the phase by the refractive index, which is assumed to be known, so as to obtain an estimate of the volume of each red blood cell. The Inventors have observed that according to the method described in this publication, it is preferable if not essential to wait for the red blood cells to sediment so that they accumulate in the same plane with the same orientation. This is because, since red blood cells are biconcave particles, estimation of their volume on the basis of an image requires that their orientations be known. Otherwise, the estimation of the volume of the red blood cells may be subject to a large uncertainty.

This difficulty is lessened by the presence of the sphering agent in the sample. Specifically, the Inventors have found that in the presence of such a sphering agent, obtaining a complex image in a reconstruction plane allows correct estimation of the volume of the red blood cells, or their mean volume. The question of their orientations no longer arises, since their shape is spherical. There is therefore no need to wait for any sedimentation.

According to a first embodiment of the invention, a mean volume of particles of interest, in this case red blood cells, is estimated. Such a volume is commonly referred to as mean cellular volume. The estimation method follows the steps represented in FIG. 2.

Step 100: acquisition of an image $I_0$ of the sample by the image sensor 16. One of the benefits of the lens-free configuration represented in FIG. 1 is the wide observed field, making it possible to address a large number of particles simultaneously. The observed field depends on the size of the image sensor 16, being slightly smaller than the detection surface of the latter because of the spacing between the pixels of the sensor and the sample. The observed field is generally more than 10 $mm^2$, and is typically between 10 $mm^2$ and 50 $mm^2$, which is significantly more than with a microscope.

Step 110: application of a propagation operator h to an image obtained on the basis of the image $I_0$ acquired during step 100, in order to obtain a complex image $A_z$ in a reconstruction plane $P_z$. Preferably, the propagation operator is applied to the acquired image $I_0$, optionally normalized by the average size $\overline{I_0}$ of the acquired image. The application of the propagation operator, by a convolution as mentioned above, makes it possible to form a complex image $A_z$ in the reconstruction plane $P_z$. Various ways of obtaining a complex image in the reconstruction plane are presented below in connection with step 210 of the second embodiment.

The reconstruction plane $P_z$ may be defined by using a numerical focusing algorithm known to the person skilled in the art, consisting in using various propagations in different reconstruction planes, each plane being located at a different reconstruction distance from the detection plane. A clarity criterion is established on the basis of each complex image reconstructed. The reconstruction plane finally adopted, referred to as the focusing plane $P_{focus}$, is the one for which the clarity criterion is optimal. This plane is a plane in which the sample extends, and in which the majority of the particles of interest 10; present in the sample extend. As an alternative, the focusing plane is determined a priori.

Step 120: formation of an image, referred to as the observation image $I_{obs}$, on the basis of the modulus or the phase of the reconstructed complex image. The observation image $I_{obs}$ makes it possible to observe the particles of the sample. The observation image $I_{obs}$ corresponds to an image of the modulus $M_z$ or of the phase $\varphi_z$ of the complex image $A_z$ formed in the reconstruction plane, in this case the focusing plane $P_{focus}$. In the observation image $I_{obs}$ the particles of interest $10_i$ correspond to a region of interest $ROI_i$ having a predetermined shape. Because of the presence of the sphering agent, this is a circular shape, each particle of interest $10_i$ forming a disc. A morphological analysis of the image of the modulus or of the phase makes it possible to detect each region of interest $ROI_i$ associated with a particle of interest $10_i$. This step also makes it possible to obtain a number $N_i$ of particles of interest $10_i$.

The sample may comprise other particles $10_j$ with shapes and/or sizes different to those of the particles of interest $10_i$. The morphological analysis of the modulus or of the phase makes it possible to discriminate the particles of interest $10_i$ from the other part $10_j$.

Step 130: Estimation of the volume $V_i$ of each particle of interest $10_i$.

On the basis of the detection on the observation image $I_{obs}$, of each region of interest $ROI_i$ associated with a particle of interest $10_i$, a dimension $d_i$ of the region of interest, for example the diameter, is determined, which makes it possible to estimate the volume $V_i$ of the associated particle of interest $10_i$, based on the assumption according to which the particle of interest is spherical. The dimension $d_i$ may initially be obtained as pixels then converted into μm based on a calibration factor determined during a calibration phase with spherical particles of known volumes, or determined by a reference method. The assumption of sphericity of the particles of interest is validated by the presence of the sphering agent $10_r$ in the sample.

Step 140: Determination of statistical parameters.

The term statistical parameter refers to a parameter characterizing the statistical distribution of the volume of the particles or characterizing the statistical distribution of the dimensions $d_i$ determined during step 130. It may in particular be a mean value, a median value or a dispersion parameter, for example the standard deviation σ.

This step may make it possible to determine statistical parameters of the volumes $V_i$ of particles of interest $10_i$ estimated during step 130. For example, the mean volume $\overline{V}$ of the particles of interest $10_i$ may be determined on the basis of the volumes $V_i$ of particles of interest $10_i$ estimated during step 130.

As an alternative, a mean dimension $\overline{d}$ of the particles is determined, that is to say a mean of the dimensions $d_i$ of each particle of interest $10_i$, then the mean volume $\overline{V}$ is determined on the basis of the mean dimension while taking into account a calibration function formed with calibration samples. The mean volume of the particles of interest in the calibration samples is known, for example being determined by a reference method. Such a calibration is represented in FIG. 3E, which will be described below in connection with the experimental tests.

When the particles of interest $10_i$ are red blood cells, a mean cellular volume (VGM) is thus obtained. A dispersion indicator of the dimension $d_1$ of the particles of interest may also be calculated, the dispersion indicator being, for example, the standard deviation σ of the dimensions $d_i$. When the particles of interest are red blood cells, a distribution index (IDR) of the red blood cells may thus be determined. The conversion between the dispersion indicator of the dimension $d_i$ of the particles of interest and the distribution index may be carried out based on a calibration. The calibration makes it possible to establish a calibration function relating the dispersion indicator, for example σ, to the IDR of the calibration sample, the IDR of which is known.

Step 140 may also comprise the establishment of a distribution of the estimated volumes $V_i$, or of the dimensions $d_i$ of the particles of interest, and the estimation of a dispersion parameter of such a distribution, for example a full-width at half-maximum or a full-width at one-tenth maximum. When the particles of interest are red blood cells, this makes it possible to determine a ratio usually referred to by the acronym RDW (Red blood cells Distribution Width).

Step 150: Determination of Volume Ratios

During this step, the total volume occupied by the particles of interest $10_i$ in the observation field is estimated, and a ratio is calculated between the total volume of the particles of interest $10_i$ and the sample volume in the observation field of the image sensor 16. When the particles of interest $10_i$ are red blood cells, it is thus possible to determine the hematocrit (Ht) in the sample. The total volume of the particles of interest may be obtained by multiplying the mean volume of the particles of interest, resulting from step 140, by the number $N_i$ of particles of interest $10_i$, established during step 120

$$Ht = \frac{N_i \times VGM}{V},$$

where V represents the volume of the sample.

This first embodiment was tested on blood samples, the results being discussed below in connection with the experimental tests and FIGS. 3A to 3F.

Such a method is, however, sensitive to the determination of the focusing plane $P_{focus}$ in which the complex image is reconstructed. It assumes a certain coplanarity of the particles of interest.

The Inventors have developed a second embodiment making it possible to estimate the representative volume of the particles of interest on the basis of the image $I_0$ acquired by the image sensor 16. The main steps of this method are described in connection with FIG. 4A. The method is schematized in FIG. 4C. In this example, the representative volume is the mean volume of the particles of interest.

Step 200: acquisition of an image $I_0$ of the sample by the image sensor. This step is similar to step 100 described above.

Step 210: obtaining a stack of complex images. During this step, the propagation operator h is applied to an image obtained on the basis of the image $I_0$ acquired during step 200, in order to obtain a stack of complex images $A_z$ at various distances from the detection plane $P_0$. As mentioned above, the propagation operator may be applied to an image representing the square root $\sqrt{I_0}$ of the acquired image $I_0$, optionally normalized by the mean value $\overline{I_0}$ of the acquired image.

According to a first variant, the propagation operator h is applied to the image $I_0$ by successively considering various propagation distances $z_1 \ldots z_n$ between the detection plane and the sample. As many complex images $A_{z_1} \ldots A_{z_n}$ as propagation distances are thus obtained. The propagation distances are such that the complex images are formed between the detection plane and the sample, or even beyond the sample. This first variant may have a drawback associated with the quality of the complex images reconstructed, the latter being affected by a reconstruction noise usually referred to by the term "twin image". The presence of such noise is due to the fact that the acquired image $I_0$ does not contain information relating to the phase of the exposure light wave 14. For this reason, the holographic reconstruction is carried out on the basis of incomplete optical information, based only on the intensity of the light wave 14 collected on the image sensor 16. Improvement of the quality of the holographic reconstruction has been the subject of numerous developments using algorithms often referred to as "phase retrieval", making it possible to estimate the phase of the light wave to which the image sensor is exposed. This type of algorithm makes it possible to limit the reconstruction noise affecting the reconstructed complex image.

Also, according to a second variant which is represented in FIG. 4B, during a step 212 a holographic reconstruction algorithm is applied in order to form a complex image, referred to as the reference image $A_{ref}$ in a reference plane $P_{ref}$. The reference plane is a plane advantageously perpendicular to the propagation axis Z and/or parallel to the detection plane $P_0$. It is preferably a plane $P_{10}$ in which the sample extends. This is because it is generally in this plane that the spatial resolution of a reconstructed complex image is optimal, such a principle being the basis of the numerical focusing algorithm is mentioned above.

According to a first possibility, the sample is illuminated successively or simultaneously in various spectral bands $\Delta\lambda_k$, and an image $I_0(\Delta\lambda_k)$ representative of each spectral band is obtained in the detection plane $P_0$. The algorithm makes it possible to obtain a complex image $A_{ref}(\Delta\lambda_k)$ of the sample 10 in the reference plane, in each spectral band $\Delta\lambda_k$. The complex images thus obtained may be combined, for example by calculating a mean, at each pixel, of the modulus and of their phase, which makes it possible to form the reference image $A_{ref}$. As an alternative, the complex reference image is a complex image $A_{ref}(\Delta\lambda_k)$ in one spectral band $\Delta\lambda_k$. Such an algorithm has been described in the publication S. N. A. Morel, A. Delon, P. Blandin, T. Bordy, O. Cioni, L. Hervé, C. Fromentin, J. Dinten, and C. Allier, "Wide-Field Lensfree Imaging of Tissue Slides," in Advanced Microscopy Techniques IV; and Neurophotonics II, E. Beaurepaire, P. So, F. Pavone, and E. Hillman, eds., Vol. 9536 of SPIE Proceedings (Optical Society of America, 2015) as well as in the patent application FR1554811 filed on 28 May 2015, and more precisely in the iterative steps 100 to 500 described in this application. It has been shown that the use of two or three different spectral bands makes it possible to obtain a complex reference image $A_{ref}$ having a good reconstruction quality.

According to a second possibility, which corresponds to a preferred variant, the complex reference image $A_{ref}$ is calculated on the basis of an image $I_0$ acquired from the sample when the latter is illuminated in a single spectral band $\Delta\lambda$. The complex reference image may be obtained by using an iterative algorithm such as that described in the patent application FR1652500 filed on 23 Mar. 2016, and more precisely according to steps 110 to 160 described in said patent application.

Lastly, the complex reference image $A_{ref}$ may be obtained on the basis of the acquired image by means of other known reconstruction algorithms, one example being described in US2012/0218379.

The coordinate $z_{ref}$, along the Z axis, of the reference plane $P_{ref}$ is determined either a priori, in particular when the position of the sample relative to the image sensor 16 is known, or by means of a numerical autofocus, based on a clarity criterion of the reference image $A_{ref}$, the latter being clearer when the reference plane corresponds to the plane in which the particles are located. The clarity criterion may be applied to the image of the modulus $M_{ref}$ or of the phase $\varphi_{ref}$ of the reference image.

The complex image $A_{ref,z}$ is referred to as being a reference image because it is used as a basis for obtaining so-called secondary complex images $A_{ref,z}$ during a step 214 along the propagation axis Z. During this step, the complex reference image $A_{ref}$ is propagated according to a plurality of reconstruction distances z by using a propagation operator h as defined above, so as to provide a plurality of so-called secondary complex images $A_{ref,z}$ reconstructed at the various distances z from the reference plane $P_{ref}$. Thus, this step comprises the determination of a plurality of complex images $A_{ref,z}$ such that:

$$A_{ref,z} = A_{ref} h_z \text{ with } z_1 \le z \le z_n.$$

The values $z_1$ and $z_n$ are the minimum and maximum coordinates, along the Z axis, between which the complex reference image is propagated. Preferably, the complex images are reconstructed according to a plurality of z coordinates between the sample 10 and the image sensor 16. The Inventors assessed that it was preferable to obtain secondary complex images on either side of the reference plane $P_{ref}$, such that $z_1 \le z_{ref} \le z_n$. Preferably, two adjacent reconstruction planes are separated from one another according to a fine mesh size, lying for example between 1 µm and 50 µm, and example 5 µm or 10 µm. This is a local propagation because it is carried out according to a distance of between 10 µm and 2 mm on either side of the reference plane $P_{ref}$, for example at ±200 µm. In contrast to the image $I_0$ acquired by the image sensor 16, the complex reference image $A_{ref}$ advantageously describes the exposure light wave 14, particularly in terms of its phase. Consequently, it is assessed that the secondary images $A_{ref,z}$ obtained by propagation of the reference image $A_{ref}$ form a good descriptor of the exposure light wave 14 in the various reconstruction planes. Thus, the secondary complex images are calculated rapidly without the need to use an iterative method, such as that used for calculating the complex reference image $A_{ref}$. The method consisting in applying an iterative algorithm in order to establish a complex reference image $A_{ref}$ (step 212), then in the obtaining secondary complex images by applying a propagation algorithm h to a complex reference image (step 214), makes it possible to obtain a stack of complex mages $A_{ref,z_1} \ldots A_{ref,z_n}$ while optimising the calculation means.

According to another embodiment, an iterative reconstruction method such as that described above is used on the basis of the acquired image $I_0$ by successively considering various reconstruction distances $z_1 \ldots z_n$. A stack of complex images $A_{z_1} \ldots A_{z_n}$ is then obtained.

Whatever the variants used to obtain the stacks of complex images, at the end of step 210 a stack of complex images is provided which makes it possible to ascertain a complex expression $A(x,y,z)$ of the exposure light wave 14 at various distances z from the detection plane $P_0$. The stack of complex images is schematized in 4C.

Step 220: Detection of Particles of Interest $10_i$ and their Planar Coordinates $(x_i, y_i)$.

This step consists in obtaining the planar coordinates $(x_i, y_i)$ of particles of interest $10_i$ in the radial plane XY. This step may be carried out based on the image acquired by the image sensor, but it is generally preferred to carry it out based on an observation image $I_{obs}$ formed on the basis of a complex image in the stack of complex images which is established during step 210. The observation image $I_{obs}$ corresponds, for example, to the image of the modulus $M_z$ or of the phase $\varphi_z$ of the complex image $A_z$ taken into account.

Preferably, a complex image established in a plane in which the sample extends is taken into account. In the observation image $I_{obs}$, each particle of interest $10_i$ is associated with a region of interest $ROI_i$ having a predetermined shape. The localization of each region of interest $ROI_i$ may be carried out automatically. To this end, as described in connection with step 120 of the first embodiment, the particles of interest $10_i$ are detected by morphological analysis. The morphological analysis may take into account one or more morphological criteria corresponding to a region of interest $ROI_i$, for example its area. Algorithms based on spatial correlation with predetermined shapes may also be used.

The sample may comprise particles $10_j$ other than the particles of interest $10_i$ to be analyzed. In this case, the morphological analysis described above may make it possible to discriminate the particles of interest from the other particles $10_j$. Classification algorithms based on shape criteria may be used to make it possible to distinguish between the particles of interest $10_i$ and the other particles $10_j$.

The position $(x_i, y_i)$, in the radial plane XY, of the particles of interest $10_i$ detected is then determined by considering, for example, the centroid of each region of interest $ROI_i$ resulting from the morphological analysis. This step also makes possible to count a quantity of particles of interest $N_i$ in the observation field of the image sensor.

In FIG. 4C, a planar position $(x_i, y_i)$ of a particle of interest is represented in the form of a vertical dotted line parallel to the propagation axis Z.

Step 230: Formation of a Profile Associated with each Particle of Interest.

On the basis of each complex image forming the stack of images resulting from step 210, a characteristic quantity of the exposure light wave 14 is estimated at each planar position $(x_i, y_i)$ determined during step 220, and at a plurality of distances z from the detection plane $P_0$, then a profile representing the variation of the characteristic quantity along the propagation axis Z is formed. The characteristic quantity may, in particular, be established on the basis of the modulus and the phase of the exposure light wave 14. It may be the modulus, the phase, or a combination thereof. At the end of this step, a profile corresponds to each particle of interest $10_i$. Such a profile is schematized in FIG. 4C. This diagram represents a profile $M_i(z)$ obtained by considering the modulus of each complex image at the planar position $(x_i, y_i)$ represented by a dotted line.

FIG. 4D represents a profile, referred to as the modulus profile $M_i(z)$, measured by considering the modulus, at the same planar position $(x_i, y_i)$, of each complex image of a stack of complex images of a sample comprising red blood cells. The stack of complex images is formed by successive images at a distance of 5 μm from one another. The abscissa axis of this figure represents a z coordinate along the propagation axis Z. The ordinate axis represents the value of the modulus. The plane $P_{10}$ of the sample corresponds to the minimum value taken by the profile. FIG. 4E represents a profile, referred to as the phase profile $\varphi_i(z)$, formed by considering the phase of each complex image at the same planar position $(x_i, y_i)$. The modulus and phase profiles represent the respective variation of the modulus and the phase of the exposure light wave 14 along the Z axis. Since the complex images of the stack of complex images are at a distance from one another, each profile is initially formed by discrete points, an interpolation being carried out between two successive z coordinates.

The inventors have observed that, when the particles of interest are red blood cells, it is preferable to form the profiles based on the modulus of the complex expression describing the exposure light wave 14.

Step 240: Estimation of Profile Parameters Respectively Corresponding to Various Particles of Interest $10_i$.

On the basis of the profile associated with each particle of interest $10_i$ resulting from step 230, an estimation of a parameter $p_i$ is carried out. The parameter $p_i$ of each profile is obtained by applying a metric to said profile. Thus, each particle of interest $10_i$ corresponds to a parameter $p_i$ via the profile associated with said particle, for example the phase profile $\varphi_i(z)$ and/or the modulus profile $M_i(z)$. A mean value $\bar{p}$ of the parameters corresponding respectively to the various localized particles of interest is then determined. With the aid of a calibration function, a mean volume $\bar{V}$ of the particles of interest is determined on the basis of the mean value $\bar{p}$. The calibration function is obtained on the basis of calibration samples comprising particles whose mean volume is known, for example being established by a reference measurement method. The calibration samples may preferably comprise a number of particles of interest greater than 1000, for example 10000 or 15000 particles of interest. The calibration function establishes a relationship between the mean value $\bar{p}$ and the mean volume $\bar{V}$ of the particles of the sample. When the particles of interest are red blood cells, the mean volume $\bar{V}$ corresponds to the mean cellular volume VGM.

The metric applied to each profile may be one of the metrics listed below:
- a slope or a mean slope of a profile;
- a width of the profile between two points of the profile;
- an area delimited by the profile between two points of the profile;
- a minimum or maximum value of the profile.

FIG. 4D represents:
- a first metric M1, based on an area extending between a profile and two bounds P1, P2 respectively arranged on either side of a peak described by the profile (or more precisely an inverse peak). The first bound P1 corresponds to a point of the profile whose value differs by X1% from a first baseline BL1 described by the profile, for coordinates located before the peak. The second bound P2 corresponds to a bound of the profile whose value differs by X2% from a second baseline BL2 described by the profile, for coordinates located beyond the peak. In this example, X1=15.2% and X2=13.5%. The first metric M1 makes it possible to define an area of the peak, delimited by a straight line passing through the two bounds P1 and P2.
- a second metric M2, based on a full-width at half-maximum of a peak described by the profile;
- a third metric M3, based on a mean slope of a rising part of the profile.

The term metric refers to a function applied to the profile so as to obtain a parameter corresponding to the particle associated with the profile. This parameter may be a scalar value or a vector characterizing the profile and making it possible to obtain a quantitative value representative of a volume of a particle of interest.

FIG. 4E represents a fourth metric M4, which uses a profile of the modulus $M_i(z)$ and a profile of the phase $\varphi_i(z)$ passing through a particle of interest $10_i$. This metric comprises calculation of an area delimited:
- by the phase profile $\varphi_i(z)$, of which the abscissa axis represents the z coordinates and the ordinate axis represents the values of the phase at each coordinate;
- by a first straight line D1 parallel to the ordinate axis of the phase profile and passing through the coordinate $z_{min-M_i}$ of the abscissa axis, for which the profile of the modulus $M_i(z)$ takes a minimal value;

by a second straight line D2 parallel to the abscissa axis of the phase profile and passing through the coordinate $\varphi_i(z_{min-\varphi_i})$ of the ordinate axis, at which the profile of the phase $\varphi_i(z)$ takes a minimal value.

At the end of step 240, an estimate of the mean cellular volume is provided. One or more steps described below may then be carried out.

Step 250: Determination of Statistical Parameters

This step is similar to step 140 of the first embodiment, considering the dispersion of the parameter $p_i$ of each profile. As mentioned above in the description of step 140, the term statistical parameter refers to a parameter characterizing the statistical distribution of the volume of the particles or characterizing the statistical distribution of the parameters $p_i$. It may in particular be a dispersion parameter, for example the standard deviation $\sigma$ of the parameter $p_i$. The latter may be used to estimate the distribution index IDR. The relationship between the IDR and the standard deviation $\sigma$ of the parameter $p_i$, or more generally the dispersion indicator of the parameter $p_i$, may be an empirical relationship established during a calibration phase using calibration samples whose IDR is known.

Step 260: Determination of Volume Ratios.

This step is similar to step 150 of the first embodiment.

Experimental Tests

The embodiments described above were subjected to experimental tests under the following conditions:

Sample 10: this is human blood diluted to 1/600 in a phosphate buffer PBS, to which a concentration of 100 mg/l of sphering agent 3-(N,N-dimethyldodecylammonio)propanesulfonate.

Light source 11: Cree MC-E Color light-emitting diode, comprising three light-emitting diodes that can be activated simultaneously or successively, each diode respectively emitting in the following spectral bands $\Delta\lambda$: 440 nm-460 nm; 500 nm-540 nm; 624 nm-648 nm. As an alternative, a laser diode emitting at 405 nm and with a power of less than 5 mW was also used.

Fluidic chamber 15: Countess chamber with a thickness of 100 μm arranged on the image sensor, or glass chamber with a thickness of 100 μm.

Image sensor 16: CMOS Aptina MT9J003 monochrome 3884×2764 pixel sensor, each pixel measuring 1.67 μm on a side, the detection surface extending over about 30 mm². In view of the thickness of the fluid chamber, the sample volume addressed by each image amounts to about 2.8 μl.

Distance D between the light source 11 and the sample 10: between 2 cm and 30 cm.

Diameter of the aperture of the spatial filter 18: 150 μm, such a filter not being necessary when the light source is a laser diode.

Figure 2:
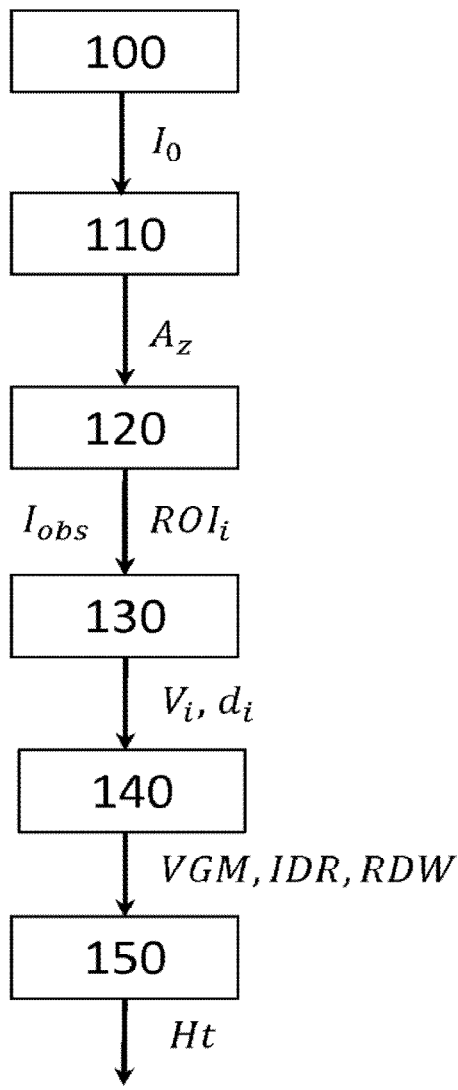
FIG. 2 shows the main steps of a first embodiment of the invention.

In a first series of tests, the first embodiment described in connection with FIG. 2 was tested, a light source being a laser diode. FIGS. 3A and 3B represent the mean cellular volume of the red blood cells, expressed in μm (abscissa axis). The estimates of FIG. 3A were obtained by forming a complex image in the sample plane, using a reconstruction algorithm such as that described in the patent application FR1652500 filed on 23 Mar. 2016. The estimates of FIG. 3B were obtained by forming a complex image in the sample plane by simple application of a holographic reconstruction operator on the basis of the square root of the image acquired by the image sensor. The $r^2$ correlation coefficients obtained in the two figures are 0.88.

Various blood samples were then tested. FIGS. 3C and 3D represent various results obtained by carrying out steps 100 to 150 of the first embodiment. They respectively show:

the mean cellular volumes of the samples (ordinate axis) as a function of reference measurements (abscissa axis). The $r^2$ correlation coefficient between the reference measurements and the estimates obtained by the method is equal to 0.91.

the hematocrit of the samples (ordinate axis) as a function of a reference measurement (abscissa axis). The $r^2$ correlation coefficient between the reference measurements and the estimates obtained by the method is equal to 0.94.

The reference measurements were carried out by using the HORIBA ABX Pentra 120 DX device. In order to evaluate the effect of the sphering agent, the method described in connection with FIG. 2 was carried out with and without a sphering agent. FIG. 3E represents, for various samples, the determination of the mean cellular volume (ordinate axis), established by a reference method, as a function of the mean the dimensions of each particle (abscissa axis) estimated on the basis of the image. The samples with and without a sphering agent are respectively schematized by a round and square symbol. This figure makes it possible to establish one calibration function for the samples comprising a sphering agent and another calibration function for the samples without a sphering agent. FIG. 3F shows, for various samples, the mean cellular volume (ordinate axis) obtained by applying the calibration functions determined as indicated in connection with FIG. 3E, as a function of the mean cellular volume of each sample, established by a reference method (abscissa axis), this being done for samples with and without a sphering agent. For the samples without a sphering agent (symbol of square shape), the $r^2$ correlation coefficient is equal to 0.85, while for the samples with a sphering agent (symbol of round shape), the $r^2$ correlation coefficient reaches 0.95. These tests show the benefit of using a sphering agent in the sample: it makes it possible to improve the correlation of the measurements with the reference measurements. Consequently, the presence of the sphering agent significantly improves the reliability of the method.

In a second series of tests, the second embodiment described in connection with steps 200 to 250 was tested. During these tests, the light source 11 was a laser diode. FIGS. 5A and 5B are images of the sample formed with a microscope, respectively without and in the presence of a sphering agent. It may be seen that in the image of FIG. 5B, the red blood cells have a circular shape.

FIGS. 5C and 5D each represent fifty profiles of the modulus $M_i(z)$ which were established respectively by using a sample not comprising and comprising a sphering agent. It may be seen that the presence of a sphering agent makes it possible to obtain better reproducibility of the profiles. FIGS. 5E and 5F are mean profiles formed respectively on the basis of the profiles plotted in FIGS. 5C and 5D.

During these experimental tests, various samples were considered and, for each of them, a mean cellular volume (VGM) was determined with the aid of a Horiba ABX Pentra120 DX device. For each sample, steps 200 to 230 of the method described above were carried out so as to detect the red blood cells, to determine their planar position and, for each of them, to obtain a profile describing the variation along the propagation axis Z of the modulus of the complex expression describing the light wave 14, the axis of each profile passing through each planar position. A metric was applied to each profile and a mean metric was obtained for example. For example, a mean metric was calculated, making it possible to estimate the mean cellular volume of the sample.

FIGS. 5G and 5H represent, for each sample, the mean cellular volume expressed in femtoliters, established according to the reference method, as a function of the value of the mean metric calculated for the sample with the aid of the profiles. FIG. 5G shows the results obtained without a sphering agent, while FIG. 5H shows the results obtained in the presence of the sphering agent. In the figures, the abscissa axis represents the mean value of the metric. It may be seen that the presence of a sphering agent minimizes the dispersion of the results around a linear relationship associating the mean cellular volume of each sample with the mean value of the metric calculated for said sample. In this example, the metric used was the first metric M1 described in connection with FIG. 3A. In each of these figures, an $r^2$ correlation coefficient representing the correlation of the measured values with a linear regression module was determined. In FIGS. 5G and 5H, the $r^2$ coefficient is respectively equal to 0.53 and 0.78. This shows that the sphering agent allows better correlation of the measured values with a linear regression model.

FIGS. 5I and 5J are similar to 5G and 5H, and respectively relate to a sample without a sphering agent and a sample with a sphering agent. The metric considered is a full-width at half-maximum of each profile, corresponding to the metric M2 described in connection with FIG. 3A. A linear relationship may be seen between the mean values of the metric and the mean cellular volumes, the dispersion being less on the sample comprising the sphering agent. In FIGS. 5I and 5J, the $r^2$ coefficient is respectively equal to 0.48 and 0.89, which confirms the advantage associated with using the sphering agent.

The results presented in FIGS. 5C to 5J were obtained by forming a complex reference image in the sample plane, then by forming secondary complex images on the basis of the complex reference image. The complex reference image was formed according to the method described in the patent application FR1652500 filed on 23 Mar. 2016, as described above.

FIGS. 6A and 6B each show fifty phase profiles $\varphi_i(z)$ established by carrying out the invention, respectively using a sample not comprising and comprising a sphering agent. As may be seen in connection with FIGS. 5C and 5D, it may be seen that the presence of the sphering agent makes it possible to obtain better reproducibility of the profiles. FIGS. 6C and 6D are mean profiles respectively formed on the basis of the profiles plotted in FIGS. 6A and 6B.

In FIGS. 7A to 7F, results obtained on the basis of a stack of complex images obtained were compared:
either directly by carrying out propagations on the basis of the image acquired by the image sensor: cf. FIGS. 7A, 7C and 7E, which corresponds to the first variant described in step 210.
or by using a complex reference image then propagating the complex reference image, as represented in FIG. 4B: cf. FIGS. 7B, 7D and 7F, which corresponds to the second variant described in step 210.

Each figure represents the mean cellular volume of a sample (ordinate axis) as a function of a mean value of metrics applied to modulus profiles established along an axis passing through each red blood cell detected (abscissa axis). FIGS. 7A and 7B were obtained by applying the metric M2 (full-width at half-maximum) defined above. FIGS. 7C and 7D were obtained by applying the metric M1 (area of the profile) defined above. FIGS. 7E and 7F were obtained by applying the metric M3 (mean value of the slope over a rising part of the profile) defined above. In each of the figures, a linearity may be observed between the mean cellular volume and the mean values of the metrics determined for each sample. The light source used was the laser diode described above.

The $r^2$ correlation coefficients of FIGS. 7A, 7B, 7C, 7D, 7E and 7F are respectively: 0.96, 0.98, 0.93, 0.94, 0.89, 0.96. This shows that the metrics are an accurate estimate of the VGM, regardless of the method adopted for forming the stack of complex images.

The second embodiment was carried out in order to estimate the mean cellular volume VGM, the hematocrit Ht and the distribution index IDR of blood samples. FIGS. 8A, 8B and 8C respectively show the VGMs, the Ht and the IDR calculated based on the profiles (ordinate axes) as a function of these quantities measured by a reference measurement (abscissa axes) with the aid of the HORIBA ABX Pentra 120 DX device. In these tests, the metric applied to each profile was the metric M1 described in connection with FIG. 4D. The light source used was the laser diode described above. A linear relationship may be observed between the estimates and the reference measurements. In FIGS. 8A, 8B and 8C, the $r^2$ correlation coefficient between the reference measurements and the estimates obtained by the method are respectively equal to 0.94, 0.95 and 0.75.

Other metrics were used, for example the full-width at half-maximum of the peak formed by each profile, corresponding to the metric M2. FIGS. 9A, 9B and 9C respectively show the VGMs, the Ht and the IDR calculated based on the profiles (ordinate axes) as a function of these quantities measured by a reference measurement (abscissa axes) with the aid of the device mentioned above. In FIGS. 9A, 9B and 9C, the $r^2$ correlation coefficient between the reference measurements and the estimates obtained by the method are respectively equal to 0.97, 0.97 and 0.71.

The metric M3 described in connection with FIG. 4D was also tested. Results similar to those described above were observed, with an $r^2$ correlation coefficient close to 0.96 in the case of estimating the VGM or the Ht.

Tests were also carried out while replacing the laser light source with the light-emitting diode as described above. The results are also found to be conclusive.

As mentioned above, the spherical shape of the particles makes it possible to overcome the uncertainties associated with their orientations. FIG. 10A represents a diagram of particles of interest $10_i$ immersed in a medium $10_m$. The first embodiment was used so as to estimate the mean cellular volume of blood samples, the VGM also being determined by a reference measurement. The first embodiment was used while taking into account reconstruction planes slightly offset from one another, the offset between two successive planes being 10 μm. This embodiment is optimal when the reconstruction plane corresponds to the focusing plane $P_{focus}$. The various reconstruction planes are schematized by lines in FIG. 10A, on either side of the focusing plane. For each reconstruction plane, an $r^2$ correlation coefficient was determined, expressing the linear correlation between the mean cellular volumes, obtained by carrying out the first embodiment, and the reference measurements.

FIG. 10B represents the variation of the $r^2$ correlation coefficient as a function of the positions of the reconstruction planes (curve C1). The mean cellular volume of the samples was also estimated with the aid of the second embodiment, the metric used being the metric M2 described in connection with FIG. 4D. FIG. 10B represents the variation of the $r^2$ correlation coefficient (curve C2).

FIG. 10B shows that the first embodiment has a certain sensitivity in respect of the position of the reconstruction plane relative to the focusing plane of the particles $P_{focus}$, the latter corresponding to the plane in which the majority of the particles extend. The second embodiment is in this regard more robust than the first embodiment.

Although described in relation to characterization of red blood cells, the invention applies to other particles that may be deformed by a sphering agent, when the intention is to obtain a rapid and reliable estimate of the volumes. Furthermore, although described in relation to the determination of a mean volume of particles of interest, the invention may be applied to other volumes characterizing the particles of interest: without limitation, this may be a median volume or the volume of each particle of interest.

The invention claimed is:

1. A method for estimating a volume representative of particles of interest immersed in a sample, the sample extending in at least one sample plane, the sample comprising a sphering agent capable of modifying the shape of the particles, the method comprising:
    a) illuminating the sample with a light source, the light source emitting an incident light wave propagating toward the sample along a propagation axis;
    b) acquiring an image of the sample with an image sensor, the image being formed in a detection plane, the sample being arranged between the light source and the image sensor, the image being representative of an exposure light wave to which the image sensor is exposed under the effect of the illumination;
    c) using the image of the sample, acquired in b), and a holographic propagation operator so as to calculate a complex expression of the exposure light wave at various positions distant from the detection plane, and forming a complex image corresponding to a distribution of the complex expression of the exposure light wave in the sample plane;
    the method further comprising:
        detecting of regions of interest, using of the complex image, each region of interest being associated with a particle of interest;
        determining a size of each region of interest;
        estimating a volume representative of the particles of interest as a function of the size of each region of interest, each particle of interest being assumed to be spherical.

2. The method according to claim 1, wherein the volume representative of the particles of interest is a mean volume of said particles of interest.

3. The method according to claim 2, the method further comprising establishing a parameter representing a dispersion of the volumes of the particles of interest.

4. The method according to claim 3, wherein the particles of interest are red blood cells, the method further comprising determining a distribution index of the red blood cells.

5. The method according to claim 1, wherein:
    the volume representative of the particles of interest is a mean volume of said particles of interest
    the particles of interest are red blood cells;
    the mean volume of the particles of interest is a mean cellular volume of the sample.

6. The method according to claim 1, further comprising determining a quantity of particles of interest in the sample.

7. The method according to claim 6, wherein:
    the particles of interest are red blood cells;
    the volume representative of the particles of interest is a mean volume of said particles of interest;
    the method further comprising determining a hematocrit on the basis of the mean volume of the particles of interest and the quantity of particles of interest in the sample.

8. The method according to claim 1, wherein the volume representative of the particles is a median volume of the particles of interest or the volume of each particle of interest taken individually.

9. The method according to claim 8, wherein the volume representative of the particles is the volume of each particle of interest taken individually, the method comprising the obtaining of a distribution of the volumes of the particles of interest.

10. The method according to claim 1, wherein there are no image formation optics or no magnification optics between the image sensor and the sample.

11. A device for estimating a volume representative of particles of interest arranged in a sample, the sample extending in at least one sample plane, the sample comprising a sphering agent capable of modifying the shape of the particles, the device comprising:
    a light source, configured to emit an incident light wave propagating toward the sample along a propagation axis and illuminate the sample;
    an image sensor configured to acquire an image of the sample, the image being formed in a detection plane, the image being representative of an exposure light wave to which the image sensor is exposed under the effect of the illumination;
    a support configured to hold the sample between the light source and an image sensor;
    a processor configured to
        receive an image of the sample acquired by the image sensor and using the image of the sample, and a holographic propagation operator so as to calculate a complex expression of the exposure light wave at various positions distant from the detection plane, and form a complex image corresponding to a distribution of the complex expression of the exposure light wave in the sample plane,
        detect of regions of interest, using of the complex image, each region of interest being associated with a particle of interest,
        determine a size of each region of interest, and
    estimate a volume representative of the particles of interest as a function of the size of each region of interest, each particle of interest being assumed to be spherical.

12. The device as claimed in claim 11, wherein there are no magnification optics or image formation optics between the image sensor and the sample.

* * * * *